United States Patent
Kataoka et al.

(10) Patent No.: US 12,062,279 B2
(45) Date of Patent: Aug. 13, 2024

(54) ELECTRIC APPARATUS, COMMUNICATION DEVICE, AND COMMUNICATION SYSTEM

(71) Applicant: OMRON Corporation, Kyoto (JP)

(72) Inventors: Nobuo Kataoka, Ritto (JP); Seiji Mizutani, Moriyama (JP)

(73) Assignee: OMRON Corporation, Kyoto (JP)

( * ) Notice: Subject to any disclaimer, the term of this patent is extended or adjusted under 35 U.S.C. 154(b) by 654 days.

(21) Appl. No.: 17/278,326

(22) PCT Filed: Sep. 19, 2019

(86) PCT No.: PCT/JP2019/036840
§ 371 (c)(1),
(2) Date: Mar. 21, 2021

(87) PCT Pub. No.: WO2020/090274
PCT Pub. Date: May 7, 2020

(65) Prior Publication Data
US 2021/0350695 A1    Nov. 11, 2021

(30) Foreign Application Priority Data
Oct. 31, 2018   (JP) ................................ 2018-205822

(51) Int. Cl.
*G05F 1/625*    (2006.01)
*G08C 15/00*   (2006.01)

(52) U.S. Cl.
CPC ............ *G08C 15/00* (2013.01); *G05F 1/625* (2013.01)

(58) Field of Classification Search
CPC ......... G08C 15/00; G05F 1/625; G06F 1/324; G06F 1/3253; G06F 13/4282; H04L 25/4917
See application file for complete search history.

(56) References Cited

U.S. PATENT DOCUMENTS 6,567,921 B1    5/2003   Guziak
8,452,993 B2 *  5/2013   Bridges ................. G06F 1/3293
                                                                          713/320
(Continued)

FOREIGN PATENT DOCUMENTS

CN    1795635    6/2006
CN    1914652    2/2007
(Continued)

OTHER PUBLICATIONS

"Office Action of China Counterpart Application" with English translation thereof, issued on Nov. 2, 2022, p. 1-p. 21.
(Continued)

Primary Examiner — Nay Tun
(74) Attorney, Agent, or Firm — JCIPRNET

(57) ABSTRACT

Provided is an electric apparatus, which has excellent convenience and operates by switching an operation mode according to the type of a communication device of a connection destination. The electric apparatus includes: a superimposition signal transmission portion which transmits, to a communication device, a superimposition signal obtained by superimposing a data signal on an operation signal; an operation mode switching portion which switches between a normal operation mode in which transmission of the superimposition signal is performed and a low current consumption mode in which transmission of the superimposition signal is not performed; and a current detection portion which detects a current value supplied from the communication device, wherein the operation mode switching portion switches the low current consumption mode to the normal operation mode when the current detection portion detects a current equal to or greater than a predetermined threshold value in the low current consumption mode.

15 Claims, 16 Drawing Sheets

(56) References Cited

U.S. PATENT DOCUMENTS

| | | | | |
|---|---|---|---|---|
| 2007/0021091 A1* | 1/2007 | Trankle | ............... | H04B 1/109 |
| | | | | 455/337 |
| 2007/0073956 A1* | 3/2007 | Goma | ............... | G06F 13/4282 |
| | | | | 710/310 |
| 2011/0026612 A1* | 2/2011 | Lombardo | .......... | H04L 25/0296 |
| | | | | 375/257 |
| 2016/0054786 A1* | 2/2016 | Chenault | ............. | G06F 13/4022 |
| | | | | 710/313 |
| 2018/0267912 A1 | 9/2018 | Kataoka et al. | | |

FOREIGN PATENT DOCUMENTS

| | | |
|---|---|---|
| CN | 105845503 | 8/2016 |
| JP | 2010148062 | 7/2010 |
| JP | 2014099677 | 5/2014 |
| JP | 2018151915 | 9/2018 |

OTHER PUBLICATIONS

"International Search Report (Form PCT/ISA/210) of PCT/JP2019/036840," mailed on Dec. 17, 2019, with English translation thereof, pp. 1-4.

"Written Opinion of the International Searching Authority (Form PCT/ISA/237) of PCT/JP2019/036840," mailed on Dec. 17, 2019, with English translation thereof, pp. 1-6.

IO-Link Community, "IO-Link Interface and System Specification," Version 1.1.2, Jul. 2013, pp. 1-262.

"Search Report of Europe Counterpart Application", issued on Jun. 27, 2022, p. 1-p. 8.

* cited by examiner

ELECTRIC APPARATUS, COMMUNICATION DEVICE, AND COMMUNICATION SYSTEM

CROSS-REFERENCE TO RELATED APPLICATION

This application is a 371 application of the International PCT application serial no. PCT/JP2019/036840, filed on Sep. 19, 2019, which claims the priority benefits of Japan Patent Application No. 2018-205822, filed on Oct. 31, 2018. The entirety of each of the above-mentioned patent applications is hereby incorporated by reference herein and made a part of this specification.

BACKGROUND

Technical Field

The present invention relates to an electric apparatus and a reception apparatus.

Related Art

Conventionally, there is a three-wire electric apparatus (a sensor or the like) which transmits and receives communication data in addition to detection information. This electric apparatus requires at least two power source lines and one signal line for power source supply and signal input/output. IO-Link (registered trademark) is one of the three-wire communication methods. Non-patent literature 1 is a specification of IO-Link.

LITERATURE OF RELATED ART

Non-Patent Literature

Non-patent literature 1: "IO-Link Interface and System Specification", version 1.1.2, July 2013, IO-Link Community, Order No: 10.002, 4 Overview of SDCI, p32-p37

SUMMARY

Problems to be Solved

However, the technique of Non-patent literature 1 has a problem that the number of wirings increases. In addition, in the technique of Non-patent literature 1, for example, a detection signal of a sensor is converted into communication data by the sensor and transmitted to the outside. Therefore, there is a problem that, due to the conversion processing, the time required for an external apparatus to recognize the detection signal becomes longer, or a circuit configuration of the sensor and the external apparatus becomes complicated.

In addition, as an example of a technique for reducing the number of wirings, it is considered to reduce the number of wirings by using a superimposition signal for communication, which is obtained by superimposing a signal related to an operation element on a data signal. A current value of the superimposition signal output by an electric apparatus corresponding to the communication using the superimposition signal fluctuates according to a value of the data signal. Therefore, when the electric apparatus is connected to a communication device that does not correspond to the communication using the superimposition signal, the communication device may erroneously detect a fluctuation in the value of the data signal as ON/OFF switching of the apparatus.

An aspect of the disclosure is accomplished in view of the above problems, and an object of the disclosure is to provide an electric apparatus or the like which has excellent convenience and operates by switching an operation mode according to the type of a communication device of a connection destination.

Means to Solve Problems

The present invention adopts the following configuration in order to solve the above-described problems.

That is, an electric apparatus according to an aspect of the disclosure includes: a superimposition signal transmission portion which transmits an operation signal corresponding to a state of an operation element to an external communication device or inputs an operation signal for controlling an operation element from the communication device, and transmits, to the communication device, a superimposition signal obtained by superimposing a data signal indicating predetermined information on the operation signal; an operation mode switching portion which switches between a normal operation mode in which the transmission of the superimposition signal is performed and a low current consumption mode in which the transmission of the superimposition signal is not performed; and a current detection portion which detects a current value supplied from the communication device, wherein the operation mode switching portion switches the low current consumption mode to the normal operation mode when the current detection portion detects a current equal to or greater than a predetermined threshold value in the low current consumption mode.

A communication device according to an aspect of the disclosure, which is capable of communicating with the electric apparatus according to the present invention, includes: an operation signal processing portion which detects the operation signal; a data signal processing portion which extracts the data signal from the superimposition signal; and a current control portion which supplies a current to the electric apparatus in a manner that a current having a current value equal to or greater than a predetermined threshold value flows for a certain period of time after the electric apparatus is started up.

A communication system according to an aspect of the disclosure includes: the electric apparatus according to an aspect; and the communication device according to an aspect, which is connected to the electric apparatus.

Effect

According to an aspect of the disclosure, an electric apparatus or the like can be provided which has excellent convenience and operates by switching an operation mode according to the type of a communication device of a connection destination.

DESCRIPTION OF THE EMBODIMENTS

§ 1 Prerequisite Configuration Example
(Configurations of Electric Apparatus and Communication Device Corresponding to Superimposition Signal)

Figure 2:
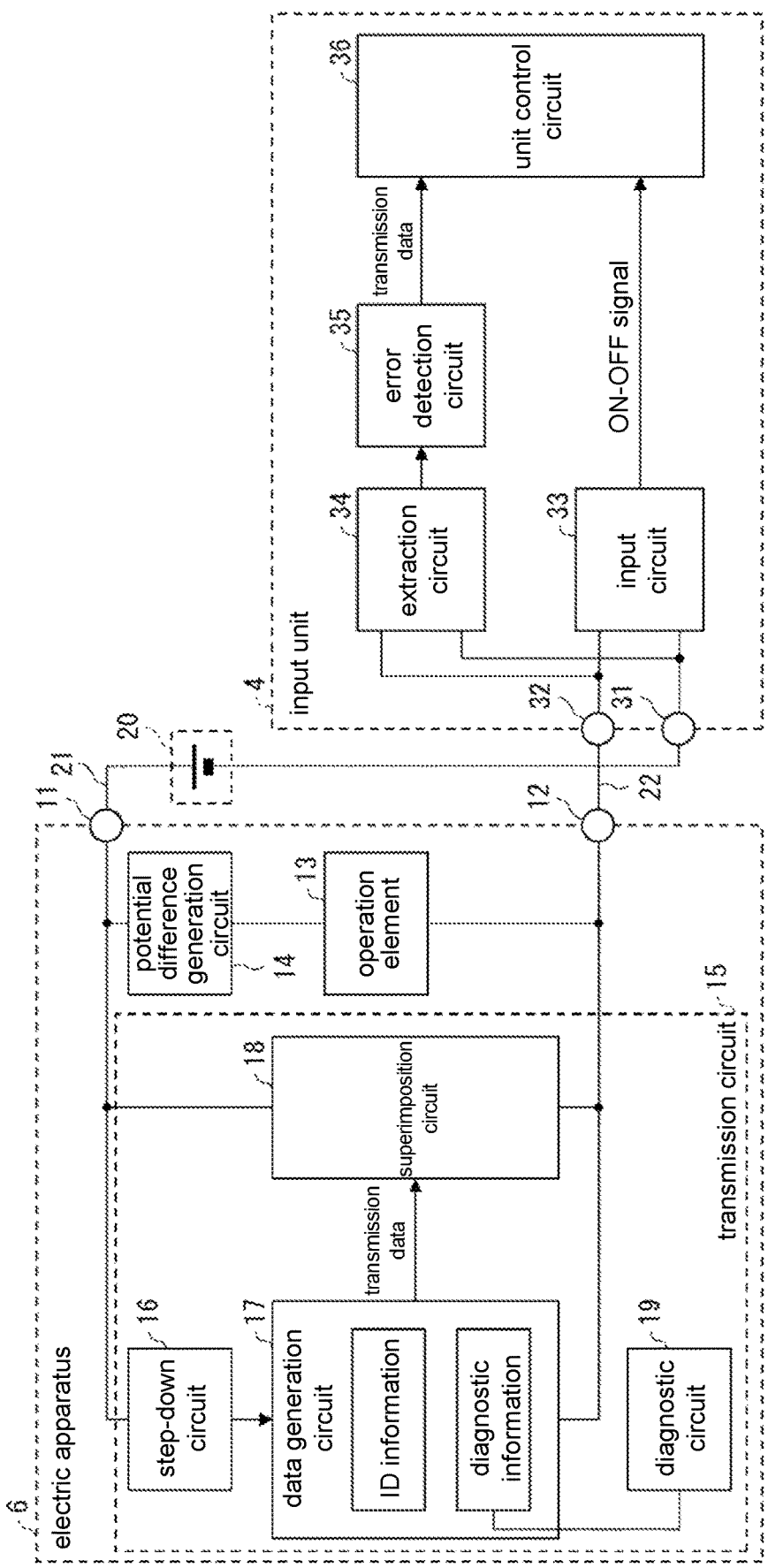
FIG. 2 is a block diagram showing an example of circuit configurations of the electric apparatus and the input unit which is a communication device, corresponding to a superimposition signal.

Before an electric apparatus and the like according to an aspect of the disclosure are described, first, configurations of the electric apparatus and the like corresponding to communication using a superimposition signal, which is obtained by superimposing a signal related to an operation element on a data signal, are described with reference to FIG. 2. FIG. 2 is a block diagram showing an example of circuit configurations of the electric apparatus and an input unit which is a communication device, corresponding to a superimposition signal. Here, an electric apparatus 6 (a limit switch) and an input unit 4 are described as an example. The electric apparatus 6 and the input unit 4 are connected to each other by a pair of signal lines 21 and 22. The signal line 21 is connected to a first input terminal 31 of the input unit 4 and a first terminal 11 of the electric apparatus 6. The signal line 22 is connected to a second input terminal 32 of the input unit 4 and a second terminal 12 of the electric apparatus 6. A power source 20 is arranged in a path of the signal line 21. The power source 20 is a direct current power source which generates a predetermined voltage (24V here).

The electric apparatus 6 includes the first terminal 11, the second terminal 12, an operation element 13, a potential difference generation circuit 14, and a transmission circuit 15. The transmission circuit 15 includes a step-down circuit 16, a data generation circuit 17, a superimposition circuit 18, and a diagnostic circuit 19. The operation element 13 is connected between the first terminal 11 and the second terminal 12. The potential difference generation circuit 14 is connected in series to the operation element 13 in an energization path between the first terminal 11 and the second terminal 12. A potential of the second terminal 12 changes according to a state of the operation element 13. That is, the second terminal 12 outputs an output signal (an operation signal) corresponding to the state of the operation element 13 to the outside (the signal line 22).

The transmission circuit 15 is connected between the first terminal 11 and the second terminal 12. The transmission circuit 15 operates using the voltage between the first terminal 11 and the second terminal 12 as a power source. The step-down circuit 16 steps down the voltage between the first terminal 11 and the second terminal 12 to a predetermined voltage, and outputs the predetermined voltage to the data generation circuit 17. The data generation circuit 17 operates by the voltage applied from the step-down circuit 16, and generates transmission data to be transmitted to the input unit 4. The transmission data includes, for example, an identifier (ID information) unique to the electric apparatus 6. The data generation circuit 17 outputs the transmission data to the superimposition circuit 18. The superimposition circuit 18 superimposes the received transmission data on the output signal as a data signal. Thereby, the transmission circuit 15 outputs the superimposition signal obtained by superimposing the data signal on the output signal from the second terminal 12 to the signal line 22.

The diagnostic circuit 19 operates by the voltage applied from the step-down circuit 16, and generates diagnostic data indicating diagnostic information of the electric apparatus 6. The diagnostic circuit 19 includes a check circuit related to an element (for example, the operation element 13) of the electric apparatus 6, and generates the diagnostic data indicating whether or not the electric apparatus 6 is normal according to whether or not the output of the check circuit is normal. The diagnostic circuit 19 outputs the diagnostic data (diagnostic information) to the data generation circuit 17. The data generation circuit 17 may include the diagnostic data in the transmission data.

Figure 1:
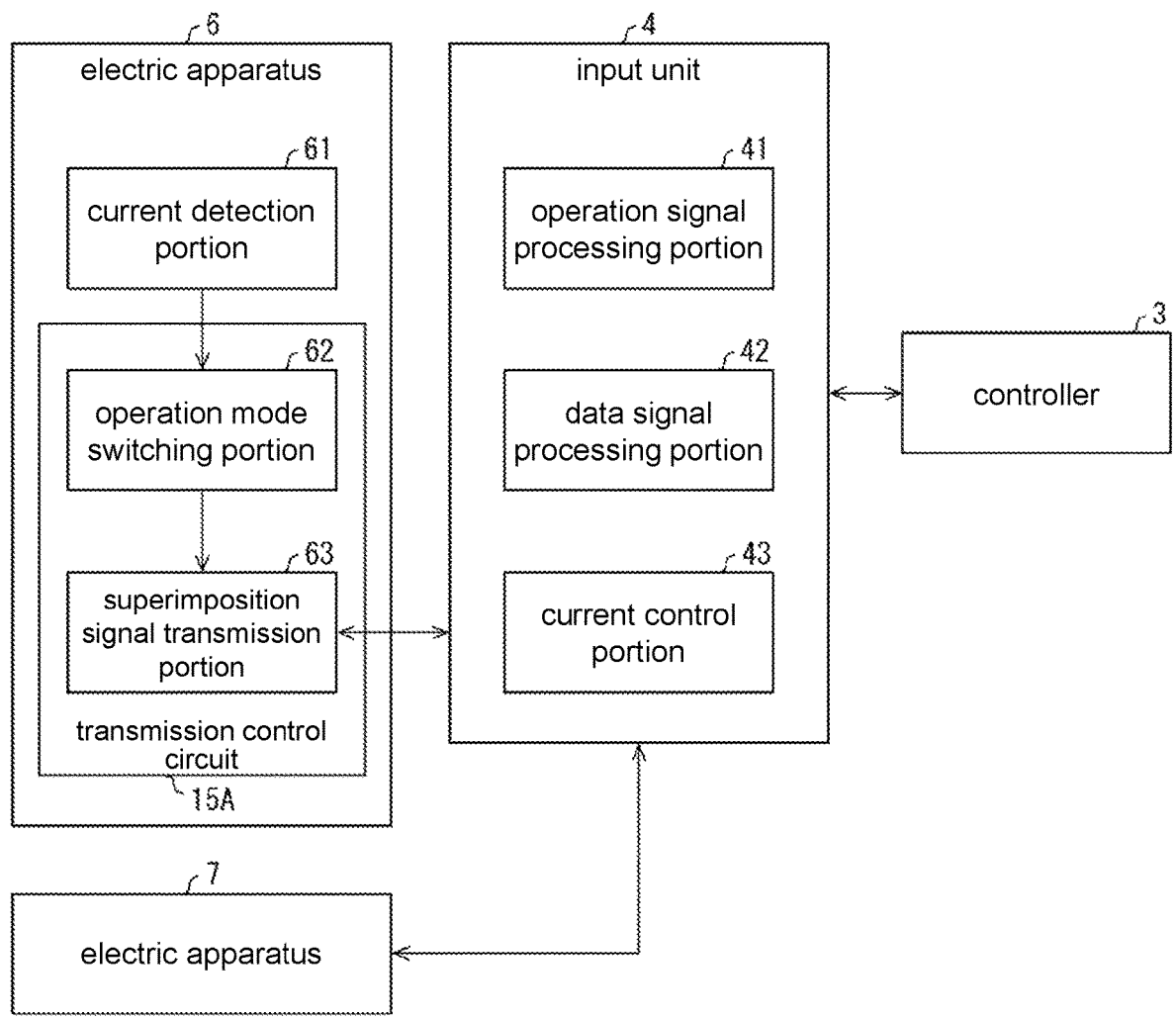
FIG. 1 is a block diagram showing an outline of main part configurations of an electric apparatus and an input unit in an aspect of the disclosure.

The input unit 4 includes a first input terminal 31, a second input terminal 32, an input circuit 33, an extraction circuit 34, an error detection circuit 35, and a unit control circuit 36. In FIG. 1, a configuration of a transmission part to a controller 3 is not shown. A potential of the first input terminal 31 is maintained constant (for example, GND). The superimposition signal is input to the second input terminal 32 from the signal line 22.

The input circuit 33 extracts the output signal from the superimposition signal and outputs the output signal to the unit control circuit 36. The extraction circuit 34 extracts the data signal from the superimposition signal and outputs the data signal to the error detection circuit 35. The error detection circuit 35 performs error detection on the data signal by using an arbitrary data check method such as cyclic redundancy check (CRC check), Manchester coding check, or the like. The error detection circuit 35 outputs the data signal and the error detection result to the unit control circuit 36. Moreover, when an error is detected from the data signal, the error detection circuit 35 may not output the data signal to the unit control circuit 36. The unit control circuit 36 outputs the output signal and the data signal to the controller 3. The error detection circuit 35 and the unit control circuit 36 can be configured by, for example, one integration circuit or a plurality of integration circuits.

(Configuration of Communication System 1)

Figure 3:
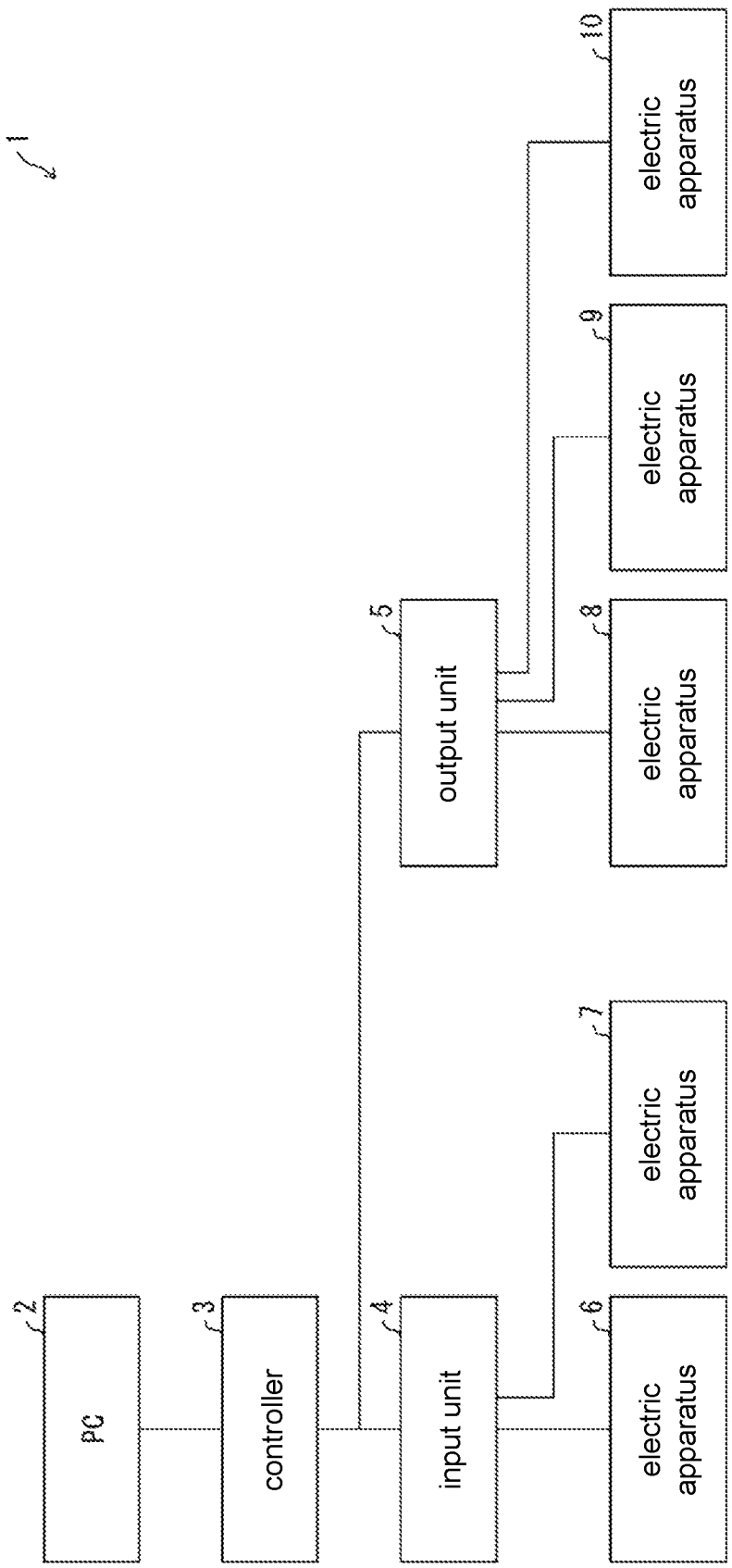
FIG. 3 is a block diagram showing a configuration of a control system in an aspect of the disclosure.

FIG. 3 is a block diagram showing a configuration of a communication system including the electric apparatus 6 corresponding to the superimposition signal. A communication system 1 includes a PC 2 (a personal computer, which is an information processing device), the controller 3, the input unit 4, an output unit 5, and electric apparatuses 6 to 10. The PC 2 is connected to the controller 3. The PC 2 receives information related to the electric apparatuses 6 to 10 from the controller 3, and transmits a control command to the controller 3. The controller 3 is connected to the input unit 4 and the output unit 5. According to the control command, the controller 3 transmits a signal for operating or controlling the electric apparatuses 6 to 10 to the input unit 4 and the output unit 5. The controller 3 transmits, to the PC 2, a signal from the electric apparatuses 6 to 10 which is received via the input unit 4 or the output unit 5.

The electric apparatuses 6 and 7 operate by electric power supplied from the input unit 4 and transmit, to the input unit 4, a signal which corresponds to the state of the operation element included in the electric apparatuses 6 and 7. Here, the electric apparatus 6 is a limit switch including a switch as an operation element. The electric apparatus 7 is a sensor including a sensing element as an operation element. When the electric apparatus 6 is a limit switch and the electric apparatus 7 is a sensor, the operation element 13 can output an ON/OFF signal as the output signal (the operation signal). Hereinafter, the case where the electric apparatus 6 is a limit switch is described, and similarly, the same applies to the case where the electric apparatus 7 is a sensor.

The output unit 5 (reception apparatus) is connected to the electric apparatuses 8 to 10. Each of the electric apparatuses 8 to 10 is connected to the output unit 5 by a pair of signal lines. The output unit 5 makes the electric apparatuses 8 to 10 operate and controls the electric apparatuses 8 to 10 based on an instruction from the PC 2 and the controller 3. In addition, the output unit 5 transmits, to the controller 3, the data signal received from the electric apparatuses 8 to 10. The output unit 5 can receive the superimposition signal from the electric apparatuses 8 to 10 and extract the data signal from the received superimposition signal. Furthermore, the output unit 5 can determine a communication state between the output unit 5 and the electric apparatuses. Besides, the output unit 5 can output the determination result to the controller 3.

The electric apparatuses 8 to 10 operate by the electric power supplied from the output unit 5, and are controlled by the control signal received from the output unit 5. Here, the electric apparatus 8 is a relay device including a coil as an operation element. The electric apparatus 9 is an electromagnetic valve including a coil as an operation element. The electric apparatus 10 is an electric actuator including a coil as an operation element.

(Operations of Electric Apparatus 6 and Input Unit 4 in Communication using Superimposition Signal)

Figure 4:
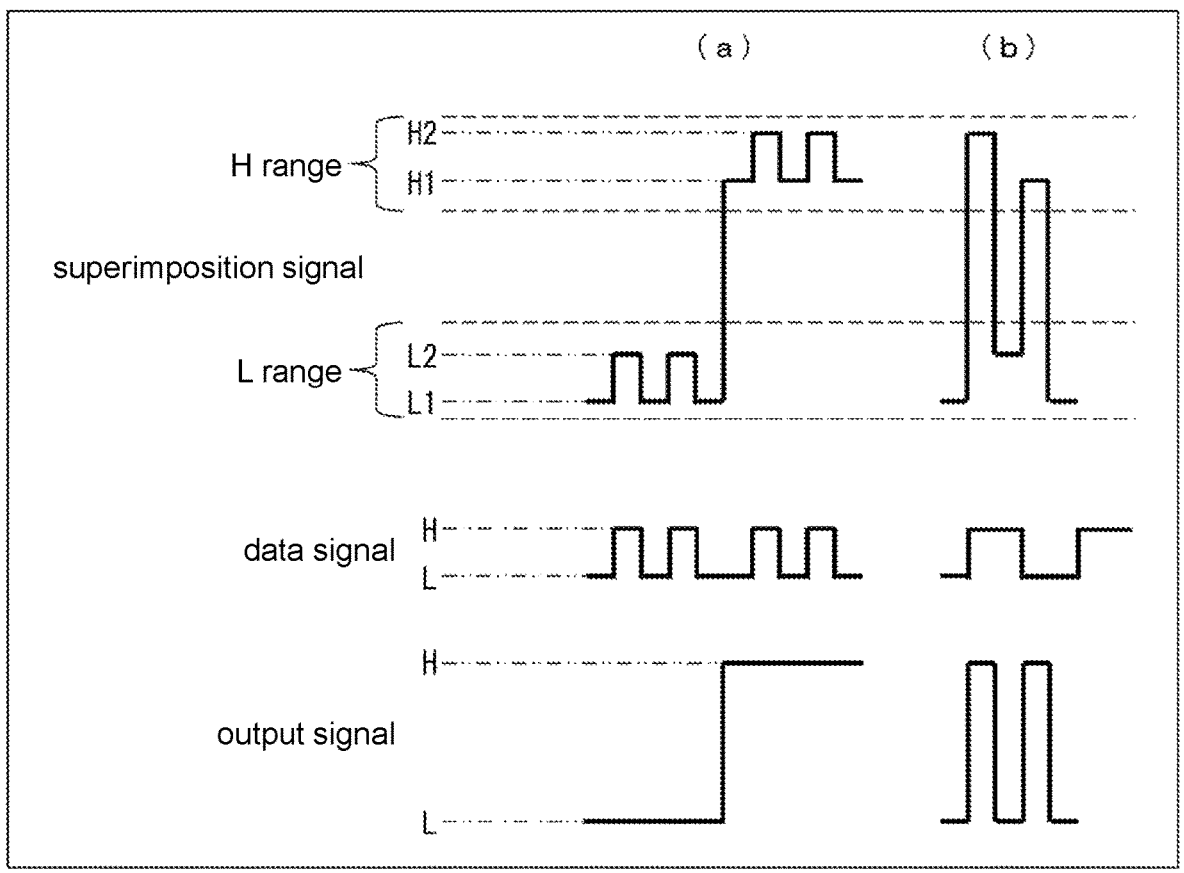
FIG. 4 is a diagram schematically showing an example of a signal waveform.

With regard to the operations of the electric apparatus and the communication device in the communication using the superimposition signal, an example of the operations of the electric apparatus 6 and the input unit 4 is described with reference to FIG. 4. Moreover, in FIG. 4, a combination of the electric apparatus 7 and the input unit 4, and a combination of any one of the electric apparatuses 8 to 10 and the output unit 5 can be described in the same manner. FIG. 4 is a diagram schematically showing an example of a signal waveform. (a) of FIG. 4 shows a case where the cycle of the output signal (the operation signal) is longer than the cycle of the data signal, and (b) of FIG. 4 shows a case where the cycle of the output signal is shorter than the cycle of the data signal. A superimposition signal is obtained by superimposing an output signal and a data signal. A waveform of the superimposition signal is obtained by superimposing a waveform of the output signal and a waveform of the data signal. An amplitude of the output signal is greater than an amplitude of the data signal. Therefore, a value of the original output signal and a value of the data signal can be known from the superimposition signal. Here, when the switch of the electric apparatus 6 is ON, the output signal is H, and when the switch of the electric apparatus 6 is OFF, the output signal is L.

The value of the superimposition signal is divided into L1, L2, H1, and H2 from the lowest one. If the superimposition signal is in the L range, the output signal is L. The L range includes L1 and L2. If the superimposition signal is in the H range higher than the L range, the output signal is H. The H range includes H1 and H2. When the superimposition signal is L1 or H1, the data signal is L. When the superimposition signal is L2 or H2, the data signal is H.

When the input unit 4 receives the superimposition signal from the electric apparatus 6, the input unit 4 determines whether the output signal from the superimposition signal is H or L (whether the switch of the electric apparatus 6 is ON or OFF). Besides, the input unit 4 can extract the data signal from the superimposition signal, and output the information corresponding to the data signal to the outside.

In this way, the input unit 4 can determine whether the switch of the electric apparatus 6 is ON or OFF based on the superimposition signal, and further execute processing corresponding to the data signal.

In addition, the input unit 4 can output the identifier and position information of the electric apparatus 6 to the outside together with information indicating the disconnection of wirings and the like. According to the information received from the input unit 4 via the controller 3, the PC 2 can notify the user of a communication state between the input unit 4 and the electric apparatus 6 by, for example, three categories of normality, warning, and failure. The user can judge whether or not the maintenance is required for the electric apparatus 6 by using the PC 2 to acquire the information related to the communication state between the input unit 4 and the electric apparatus 6.

(Error Detection in Input Unit)

Figure 5:
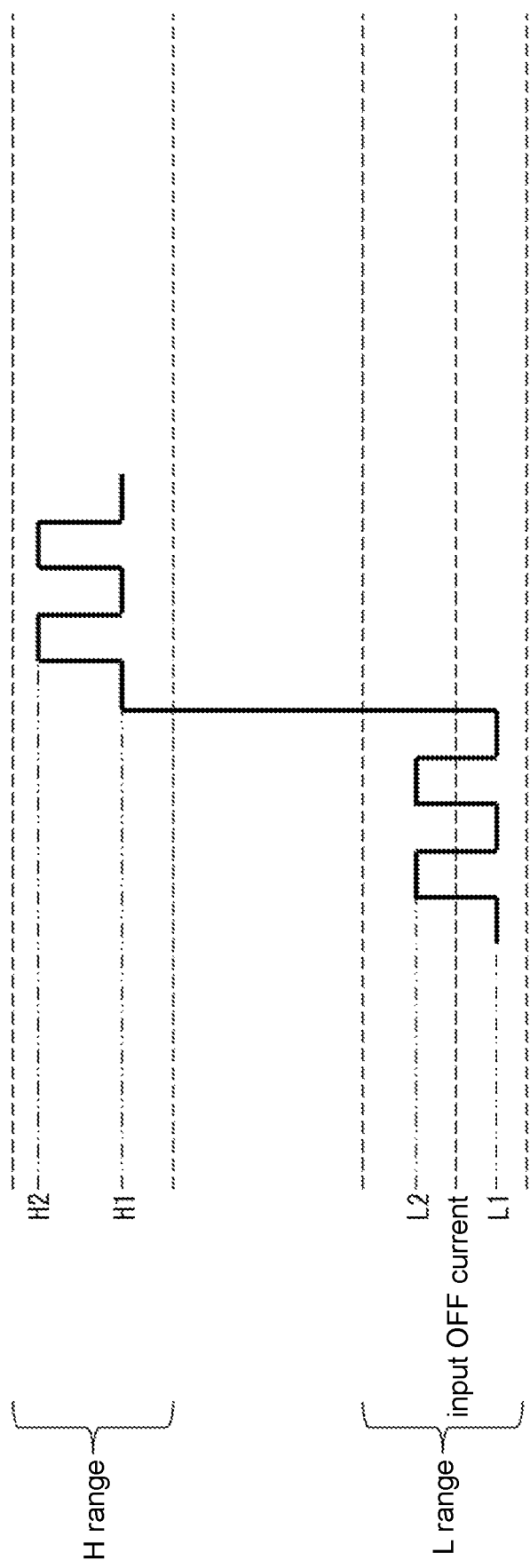
FIG. 5 is a diagram schematically showing an example of erroneously detecting ON/OFF of the electric apparatus in the input unit which is a communication device.

In FIG. 4, as a prerequisite, both the electric apparatus 6 and the input unit 4 correspond to the communication using the superimposition signal. However, there is a possibility that the input unit 4 may erroneously detect ON/OFF of the switch of the electric apparatus 6 when the input unit 4 does not correspond to the superimposition signal. An example of the error detection in the input unit 4 is described with reference to FIG. 5. FIG. 5 is a diagram schematically showing an example of erroneously detecting ON/OFF of the electric apparatus 6 in the input unit 4 which is a communication device.

As described with reference to FIG. 4, when the switch is ON, the electric apparatus 6 corresponding to the superimposition signal transmits a superimposition signal having a value in the H range to the input unit 4 as an output signal of H. Similarly, when the switch is OFF, the electric apparatus 6 transmits a superimposition signal having a value in the L range to the input unit 4 as an output signal of L. At this time, because the superimposition signal includes the output signal and the data signal, the current value shown by the superimposition signal is larger than the current value shown by the output signal.

On the other hand, it is assumed that only the output signal is input to the input unit 4 which does not correspond to the superimposition signal. That is, it is generally guaranteed that the input unit 4 determines that the switch of the electric apparatus 6 is OFF based on the superimposition signal which is shown by L1 in the diagram and is less affected by the data signal. However, the input unit 4 does not always reliably determine that the switch of the electric apparatus 6 is OFF based on the superimposition signal which is shown by L2 and is greatly affected by the data signal.

For example, a threshold value for the input unit 4 which does not correspond to the superimposition signal to determine that the switch of the electric apparatus 6 is OFF that is assumed as an "input OFF current" in the diagram. That is, the input unit 4 determines ON/OFF of the electric apparatus 6 based on the input OFF current satisfying L2>input OFF current>L1. In this case, when the switch of the electric apparatus 6 corresponding to the superimposition signal is OFF and the electric apparatus 6 transmits the superimposition signal having the value of L2 to the input unit 4, because L2>input OFF current, the input unit 4 erroneously detects that the switch of the electric apparatus 6 is ON. Because the value of the input OFF current differs according to the model, the individual difference, and the like of the input unit 4, the above-described error detection may be caused by using the electric apparatus 6 which corresponds to the superimposition signal with connection to the input unit 4 which does not correspond to the superimposition signal, and thus it is not preferable.

Preferably, as a mechanism for preventing the error detection, for example, the electric apparatus 6 detects whether or not the input unit 4 corresponds to the communication using the superimposition signal. If whether or not the input unit 4 corresponds to the communication using the superimposition signal can be detected, the electric apparatus 6 can be operated by, for example, switching between an operation mode in which the superimposition signal is transmitted and an operation mode in which only the output signal is transmitted. Moreover, the operation mode is preferably switched based on the information acquired from the input unit 4 by the electric apparatus 6, and the information may be, for example, a current value of the current supplied from the input unit 4 to the electric apparatus 6.

§ 2 Configuration Example (Configurations of Electric Apparatus and Input Unit)

FIG. 1 is an example of the configurations of the electric apparatus 6 and the input unit 4 according to an aspect of the disclosure. FIG. 1 is a block diagram showing an outline of main part configurations of the electric apparatus 6 and the input unit 4 in an aspect of the disclosure. Moreover, in the following description, both the electric apparatus 6 and the input unit 4 correspond to the communication using the superimposition signal. In addition, hereinafter, the electric apparatus 6 and the input unit 4 which correspond to the communication using the superimposition signal are described, and with the same technical idea, the same applies to the electric apparatuses 8, 9, and 10 and the output unit 5 which correspond to the communication using the superimposition signal.

The electric apparatus 6 can switch the operation mode to a normal operation mode when a current having a current value equal to or greater than a predetermined threshold value is supplied from the input unit 4 during the operation in a low current consumption mode. The electric apparatus 6 includes a current detection portion 61 and a transmission control circuit 15A, and the transmission control circuit 15A includes an operation mode switching portion 62 and a superimposition signal transmission portion 63.

The electric apparatus 6 is an apparatus capable of communicating with the input unit 4 by using the superimposition signal. The electric apparatus 6 can operate in two operation modes which are the normal operation mode in which the transmission of the superimposition signal is performed and the low current consumption mode in which the transmission of the superimposition signal is not performed. In the normal operation mode and the low current consumption mode, not only the presence or absence of the transmission of the superimposition signal may be set, but also, for example, an operation clock frequency in the low current consumption mode of the transmission control circuit 15A may be set to be lower than an operation clock frequency in the normal operation mode.

The current detection portion 61 detects a current value supplied from the input unit 4. The current detection portion 61 transmits the detected current value to the operation mode switching portion 62.

The transmission control circuit 15A corresponds to the transmission circuit 15 in FIG. 2. That is, the transmission control circuit 15A further includes the data generation circuit 17, the superimposition circuit 18, the diagnostic circuit 19, and the like, which are not shown in FIG. 1. The data generation circuit 17, the diagnostic circuit 19, and the operation mode switching portion 62 can be realized by, for example, a micro processing portion (MPU) using information stored in a memory and executing a command of a program which is software for implementing each function.

The operation mode switching portion 62 can switch the operation mode of the electric apparatus 6 between the normal operation mode and the low current consumption mode based on the current value received from the current detection portion 61. More specifically, the operation mode switching portion 62 can switch the operation mode of the electric apparatus 6 to the normal operation mode when the current detection portion 61 detects a current equal to or greater than a predetermined threshold value.

The operation mode switching portion 62 may respectively define a plurality of operation modes as, for example, the normal operation mode and the low current consumption mode, or may switch the operation mode to a third operation mode other than the normal operation mode and the low current consumption mode.

The superimposition signal transmission portion 63 transmits, to the input unit 4, a superimposition signal which is obtained by the superimposition circuit 18 superimposing the transmission data (the data signal) generated by the data generation circuit 17 on the operation signal output from the operation element 13.

The input unit 4 includes an operation signal processing portion 41, a data signal processing portion 42, and a current control portion 43. The input unit 4 is a reception apparatus (a communication device), is communicably connected to a plurality of electric apparatuses, and can receive a superimposition signal from each electric apparatus. In the shown example, the electric apparatuses 6 and 7 are respectively connected to the input unit 4. That is, the input unit 4 can receive a superimposition signal from the electric apparatuses 6 and 7. In the operation example, the input unit 4 periodically receives a data signal included in the superimposition signal from the electric apparatuses 6 and 7. Moreover, the reception of the data signal does not have to be periodic. The connection between the input unit and the electric apparatuses 6 and 7 is made by, for example, a pair of signal lines. In addition, the input unit 4 can extract the data signal from the received superimposition signal, determine the communication state with the electric apparatus which is a transmission source of the superimposition signal, and output the result to the controller 3. The input unit 4 can configure the communication system 1 as shown in FIG. 3 together with a plurality of apparatuses including the electric apparatuses 6 and 7 and the controller 3.

When a communication error in the communication with the electric apparatuses 6 and 7 is detected for the communication state between the electric apparatuses 6 and 7 and the input unit 4, the input unit 4 can determine whether or not the communication error is regarded to occur during a transition period of the value of the operation signal in the electric apparatuses 6 and 7. Moreover, communication errors detected during a period other than the transition period include, for example, a communication error caused by repeating instantaneous interruptions when a switch contact point is in an unstable state, a communication error caused by disturbance noise, a wiring disconnection, and the like.

The operation signal processing portion 41 can detect an output signal (operation signal) from the superimposition signal. The operation signal processing portion 41 corresponds to the input circuit 33 in FIG. 2, and transmits the detected output signal to a control circuit not shown (corresponding to the unit control circuit 36 in FIG. 2).

The data signal processing portion 42 can extract a data signal from the superimposition signal. The data signal processing portion 42 corresponds to the extraction circuit 34 in FIG. 2, and transmits the extracted data signal to a control circuit not shown (corresponding to the unit control circuit 36 in FIG. 2) after the error detection is performed if necessary.

The current control portion 43 can supply a current to the electric apparatus 6 in a manner that a current having a current value equal to or greater than a predetermined threshold value flows for a certain period of time after the electric apparatus 6 is started up. The current control portion 43 can control the current value of the current supplied to the electric apparatus 6 according to, for example, an instruction of a control circuit not shown (corresponding to the unit control circuit 36 in FIG. 2).

(Circuit Configurations of Electric Apparatus and Input Unit)

Figure 6:
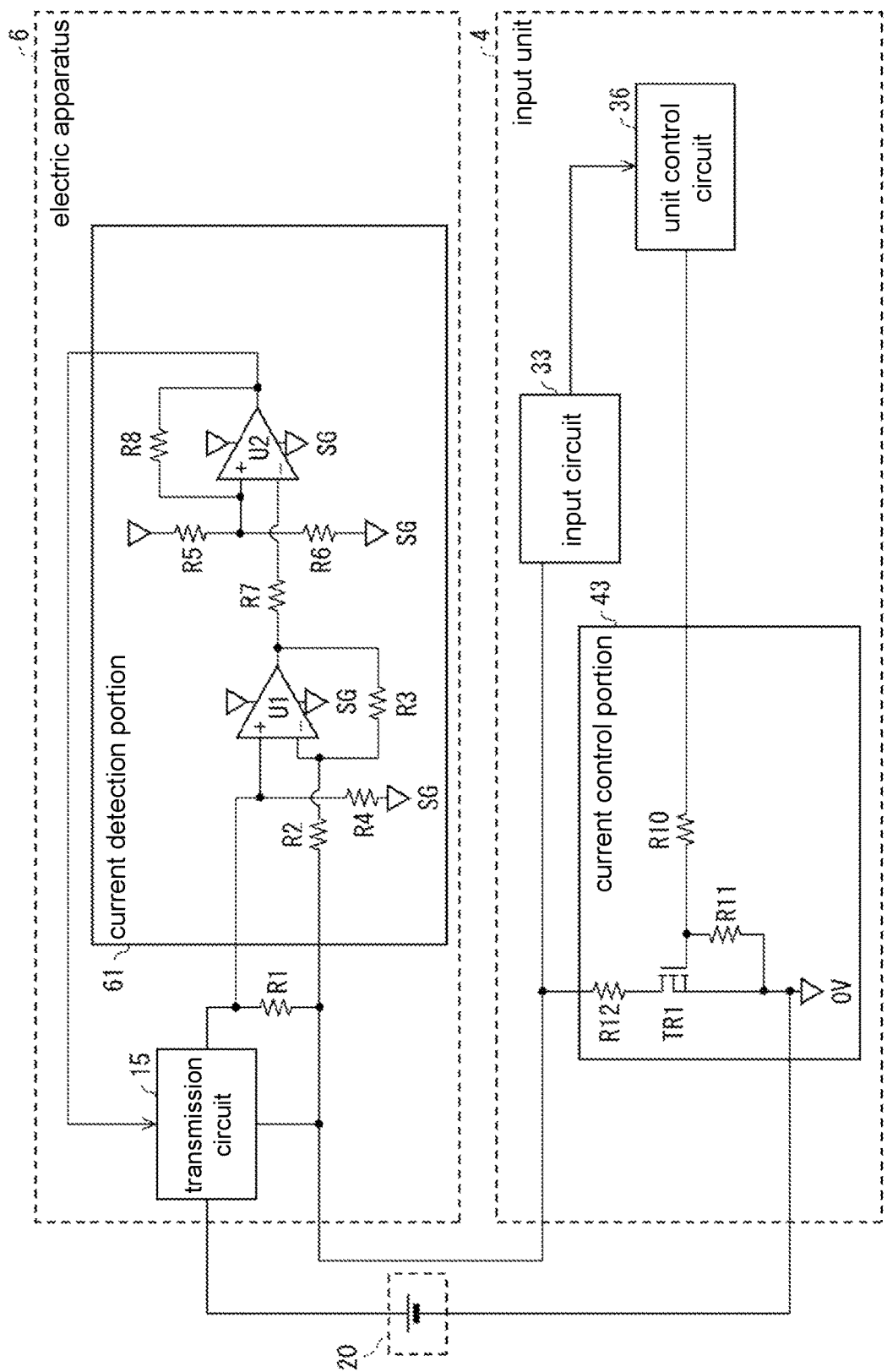
FIG. 6 is a circuit diagram showing configurations of the electric apparatus and the input unit.

FIG. 6 is an example of circuit configurations of the electric apparatus 6 and the input unit 4 according to an aspect of the disclosure. Moreover, in the shown example, the description of a part of the circuit which is already described with reference to FIG. 2 is omitted.

In the electric apparatus 6, the current detection portion 61 can detect the current value of the current supplied from the input unit 4 by using a resistor R1. The current detection portion 61 can be configured as shown in FIG. 6 by using operational amplifiers U1 and U2 operating as comparators, resistors R2 to R8, and the like. The current detection portion 61 can output a signal indicating the current value detected using the resistor R1 to the operation mode switching portion 62 included in the transmission circuit 15, after the signal is subjected to amplification and output adjustment by the operational amplifiers U1 and U2.

In the transmission circuit 15, when a signal indicating that the current value equal to or greater than a predetermined threshold value is detected is received from the current detection portion 61 when the operation mode of the electric apparatus 6 is the low current consumption mode, the operation mode switching portion 62 switches the operation mode of the electric apparatus 6 to the normal operation mode. Thereafter, the transmission circuit 15 uses the superimposition signal transmission portion 63 to transmit, to the input unit 4, the superimposition signal obtained by superimposing the data signal on the output signal.

In the input unit 4, the current control portion 43 turns on a transistor TR1 for a certain period of time according to the instruction from the unit control circuit 36. The current control portion 43 can be configured as shown in FIG. 6 by using the transistor TR1, resistors R10 to R12, and the like. That is, the current control portion 43 controls the current to flow between a collector and an emitter through the resistor R12 for a certain period of time by inputting the signal output from the unit control circuit 36 as a base current. In other words, when the transistor TR1 is turned on, the current value of the current supplied from the input unit 4 to the electric apparatus 6 becomes equal to or greater than a predetermined threshold value.

By making the current control portion 43 of the input unit 4 have the circuit configuration described above, the input unit 4 can supply the current having a current value equal to or greater than a predetermined threshold value to the electric apparatus 6 for a certain period of time. By making the current detection portion 61 of the electric apparatus 6 have the circuit configuration described above, the electric apparatus 6 can switch the operation mode and transmit the superimposition signal to the input unit 4 when the current having a current value equal to or greater than a predetermined threshold value is supplied from the input unit 4. Furthermore, the input unit 4 can extract an output signal from the superimposition signal by the input circuit 33 and transmit the output signal to the unit control circuit 36.

Moreover, when the input unit 4 does not have the current control portion 43 as shown in FIG. 2, the input unit 4 does not supply the current having a current value equal to or greater than a predetermined threshold value to the electric apparatus 6. At this time, the electric apparatus 6 does not switch the operation mode from the low current consumption mode to the normal operation mode. Therefore, the electric apparatus 6 according to an aspect of the disclosure can operate by switching the operation mode according to the type of the input unit 4 which is a connection destination.

In addition, when the electric apparatus 6 does not have the current detection portion 61 as shown in FIG. 2, it cannot be detected that the current having a current value equal to or greater than a predetermined threshold value is supplied from the input unit 4, and thus the electric apparatus 6 does not switch the operation mode and does not transmit the superimposition signal. Therefore, the input unit 4 according to an aspect of the disclosure can make the signal received by the input unit 4 different between the case where the electric apparatus 6 which is capable of transmitting the superimposition signal is connected and the case where the electric apparatus 6 which is not capable of transmitting the superimposition signal is connected.

(Specific Example of Operation Mode Switching)

Figure 7:
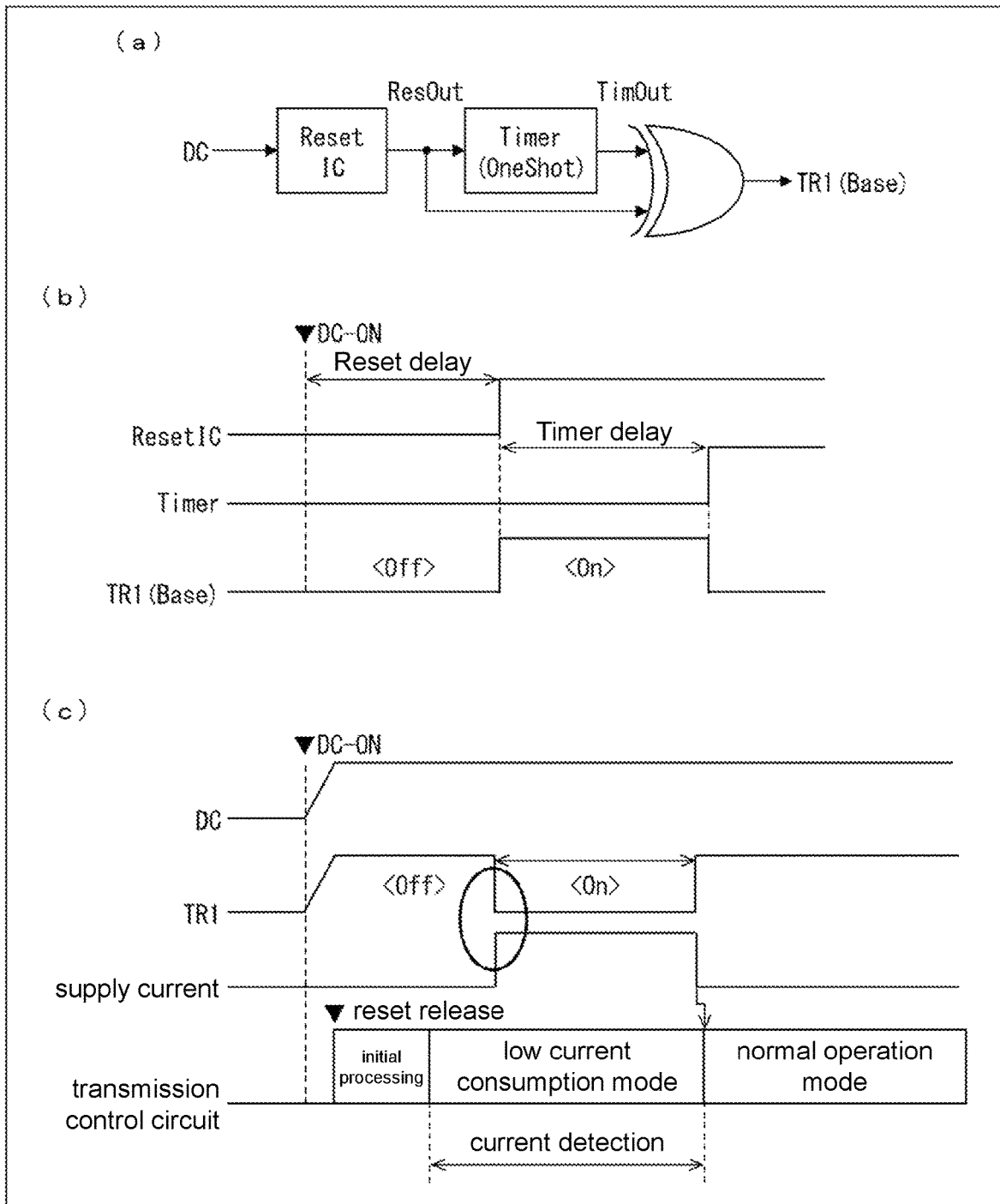
FIG. 7 is a diagram showing a specific example of operation mode switching in the electric apparatus in an aspect of the disclosure, wherein (a) shows a circuit example for controlling a current supplied from the input unit to the electric apparatus, (b) shows a temporal change from a power source ON in the circuit of (a), and (c) shows a temporal change from the power source ON in the electric apparatus and the input unit.

Each diagram of FIG. 7 is a specific example of the operation mode switching in the electric apparatus 6 in an aspect of the disclosure. (a) of FIG. 7 shows a circuit example for controlling the current supplied from the input unit 4 to the electric apparatus 6, and (b) of FIG. 7 shows a temporal change from the power source ON in the circuit of (a) of FIG. 7. (c) of FIG. 7 shows a temporal change from the power source ON in the electric apparatus 6 and the input unit 4. Moreover, in the following description, the electric apparatus 6 and the input unit 4 have the circuit configurations shown in FIG. 6.

(a) of FIG. 7 is a circuit example of a part of the unit control circuit 36 for supplying the current having a current value equal to or greater than a predetermined threshold value from the input unit 4 to the electric apparatus 6 for a certain period of time. In the shown example, "DC" shows a direct current supplied from the power source 20, "Reset IC" is a circuit that generates a reset signal, and "Timer" is a circuit that delays and outputs the input signal. The reset signal generated by the "Reset IC" is input to the "Timer" and an XOR gate by using the direct current supplied from the power source 20. The XOR gate inputs, to the base of the transistor TR1 in FIG. 6, a result which is obtained by logic calculation based on input contents of two systems connected to the "Reset IC" and the "Timer".

A temporal change from the power source ON in the circuit of (a) of FIG. 7 is shown with reference to (b) of FIG. 7. In the shown example, "DC-ON" shows a timing when the power source 20 is started up, and the "Reset IC", the "Timer", and the "TR1 (Base)" respectively show items having the same name in (a) of FIG. 7.

First, when the power source 20 is started up, the reset signal is input from the "Reset IC" to the "Timer" and the XOR gate. Because no signal is input from the "Timer" side in the input of the two systems possessed by the XOR gate, as a result of the logic calculation, the XOR gate inputs a signal indicating ON to the base of the transistor TR1. At this time, a delay indicated as "Reset delay" occurs before the "Reset IC" outputs the reset signal.

After the reset signal is input to the base of the transistor TR1, the reset signal which is output with a delay from the "Timer" is input to the XOR gate. Because the reset signal is input to the XOR gate from both the two systems, as a result of the logic calculation, the XOR gate inputs a signal indicating OFF to the base of the transistor TR1. At this time, in the "Timer", the time for inputting the reset signal to the XOR gate is delayed by a time indicated as "Timer delay" in the diagram. In this way, the input unit 4 can turn on the transistor TR1 during the time indicated as "Timer delay".

A temporal change from the power source ON in the electric apparatus 6 and the input unit 4 is described with reference to (c) of FIG. 7. In the shown example, "DC" shows the current supplied from the power source 20 to the electric apparatus 6 and the input unit 4, and "TR1" shows ON/OFF of the transistor TR1. The "supply current" shows the magnitude of the current supplied from the input unit 4 to the electric apparatus 6, and the "transmission control circuit" shows the state of the transmission control circuit 15A of the electric apparatus 6.

First, when the power source 20 is started up, the transmission control circuit 15A of the electric apparatus 6 releases the reset state, and starts the operation in the low current consumption mode after performing initial processing. Thereafter, as described with reference to (b) of FIG. 7, the transistor TR1 is turned on for a certain period of time, and the "supply current" has a current value equal to or greater than a predetermined threshold value. Then, when the transistor TR1 is turned off after a certain period of time has elapsed, the "supply current" returns to a current value smaller than a predetermined threshold value. The transmission control circuit 15A of the electric apparatus 6 switches the operation mode to the normal operation mode by the mode switching portion 62, when the current detection portion 61 detects that the "supply current" rises from below a predetermined threshold value to the predetermined threshold value or greater and then falls again to below the predetermined threshold value. In this way, the electric apparatus 6 can switch the operation mode based on the current value.

§ 3 Operation Example (Processing Flow)

Figure 8:
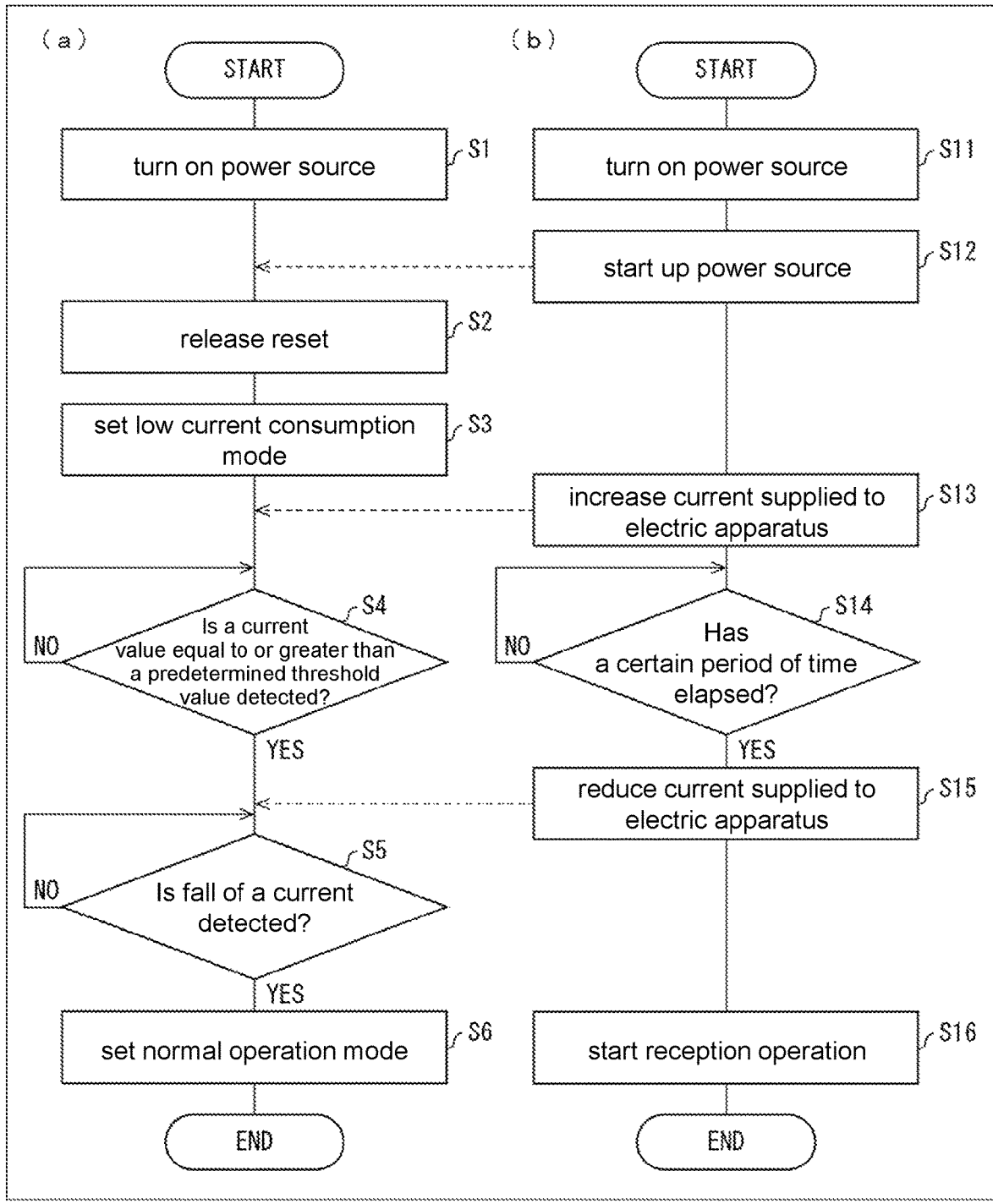
FIG. 8 is a diagram showing flows which indicate an example of processing executed by the electric apparatus and the input unit in an aspect of the disclosure, wherein (a) shows a flow of the electric apparatus, and (b) shows a flow of the input unit.

Each diagram of FIG. 8 shows a flow which indicates an example of a flow of the processing executed by the electric apparatus 6 and the input unit 4 according to an aspect of the disclosure. (a) of FIG. 8 shows a flow of the electric apparatus 6, and (b) of FIG. 8 shows a flow of the input unit 4. Moreover, in the following description, the electric apparatus 6 and the input unit 4 are connected to the power source 20 in the same manner as in FIG. 6.

First, the flow of the electric apparatus 6 is described with reference to (a) of FIG. 8. First, the power source of the electric apparatus 6 is turned on (S1). Because the power source 20 is not started up at the time of S1, the electric apparatus 6 is not started up and is in the reset state. After S1, when the power source 20 is started up by the processing of S12 described later, the current supply to the electric apparatus 6 is started. The electric apparatus 6 releases the reset state when receiving the current supply (S2). Then, after the reset state is released, the electric apparatus 6 executes the initial processing, and starts the operation in the low current consumption mode after the initial processing is completed. That is, in the electric apparatus 6, the operation mode switching portion 62 sets the operation mode to the low current consumption mode (S3).

After S3, the current detection portion 61 starts the detection that the current having a current value equal to or greater than a predetermined threshold value is supplied from the input unit 4 (S4). When the current supplied from the input unit 4 is increased by the processing of S13 described later, the current detection portion 61 detects that the current having a current value equal to or greater than a predetermined threshold value is supplied from the input unit 4 (YES in S4), and the processing proceeds to S5. In S5, the current detection portion 61 performs the detection that the current value of the current supplied from the input unit 4 falls from a predetermined threshold value or greater to below the predetermined threshold value (S5). When the current supplied from the input unit 4 is reduced by the processing of S15 described later, the current detection portion 61 detects that the current value of the current supplied from the input unit 4 falls from a predetermined threshold value or greater to below the predetermined threshold value as a fall of the current (YES in S5). Furthermore, the current detection portion 61 instructs the operation mode switching portion 62 to switch the operation mode of the electric apparatus 6 from the low current consumption mode to the normal operation mode. Then, the operation mode switching portion 62 sets the normal operation mode according to the instruction (S6).

By the above processing, the electric apparatus 6 according to an aspect of the disclosure can switch the operation mode based on the change of the current value of the current supplied from the input unit 4. That is, when the input unit 4 which changes the current value of the current supplied to the electric apparatus 6 is connected, the superimposition signal can be transmitted to the input unit 4. Moreover, in (a) of FIG. 8, the low current consumption mode is continued until the current detection portion 61 detects the fall of the current value, but the low current consumption mode may be switched to the normal operation mode at the time when the current detection portion 61 detects the current value equal to or greater than a predetermined threshold value.

Next, a flow of the input unit 4 is described with reference to (b) of FIG. 8. First, the power source of the input unit 4 is turned on (S11), and further the power source 20 is started up (S12). If the power source of the electric apparatus 6 is turned on by the processing of S1 described above, the input unit 4 and the electric apparatus 6 are electrically connected at the time of S12.

After S12, in the input unit 4, the current control portion 43 increases the current supplied to the electric apparatus 6 in order to make the current have a current value equal to or greater than a predetermined threshold value (S13). When a certain period of time elapses from the start of the supply of the current which is increased in S13 (YES in S14), the current control portion 43 reduces the current supplied to the electric apparatus 6 in order to make the current have a current value smaller than a predetermined threshold value (S15). After S15, the input unit 4 starts the reception operation for the superimposition signal (S16). That is, after the above-described processing of S5 and S6 is performed in the electric apparatus 6 based on S15, the electric apparatus 6 starts to transmit the superimposition signal.

By the above processing, the input unit 4 according to an aspect of the disclosure can make the electric apparatus 6 transmit the superimposition signal by changing the current value of the current supplied to the electric apparatus 6. Then, the input unit 4 can respectively acquire the output signal and the data signal by using the operation signal processing portion 41 and the data signal processing portion 42 with regard to the superimposition signal received from the electric apparatus 6, and execute necessary processing for performing processing corresponding to the content of each signal.

The electric apparatus 6 according to an aspect of the disclosure may determine whether or not the input unit 4 connected to the electric apparatus 6 itself corresponds to the superimposition signal, and start to transmit the superimposition signal when the input unit 4 corresponds to the superimposition signal. That is, in the electric apparatus 6, the low current consumption mode may be defined as any operation mode as long as whether or not the input unit 4 corresponds to the superimposition signal can be determined without transmitting the superimposition signal. Similarly, the normal operation mode may be defined as any operation mode as long as the superimposition signal can be transmitted.

In addition, in the above-described configuration example, the configuration is adopted in which the operation mode switching portion 62 of the electric apparatus 6 switches the operation mode of the electric apparatus 6 to the normal operation mode when the current detection portion 61 detects the current equal to or greater than a predetermined threshold value, but the condition for switching the operation mode may be arbitrary. For example, the operation mode switching portion 62 may switch the operation mode of the electric apparatus 6 to the normal operation mode when the current value of the current detected by the current detection portion 61 fluctuates in a predetermined pattern. When the fluctuation pattern in the current value is set as the condition for switching the operation mode, the operation mode can be switched without being affected by the influence of noise or the like on the current.

§ 4 Variation example 1

The electric apparatus 6 and the input unit 4 according to an aspect of the disclosure are described with reference to FIGS. 1, 9, and 10.

(Configurations of Electric Apparatus and Input Unit)

The configurations of the electric apparatus 6 and the input unit 4 according to an aspect of the disclosure are described with reference to FIG. 1. Moreover, the input unit 4 is the same as the input unit 4 in the above-described configuration example.

The electric apparatus 6 has the same basic configuration as the above-described configuration example, except that the electric apparatus 6 is in a waiting state (a standby state) or a hibernation state (a sleep state) in the low current consumption mode. That is, when the current detection portion 61 detects the current having a current value equal to or greater than a predetermined threshold value during the operation in the low current consumption mode, the electric apparatus 6 can return to the normal operation mode from the waiting state or the hibernation state.

(Specific Example of Operation Mode Switching)

Figure 9:
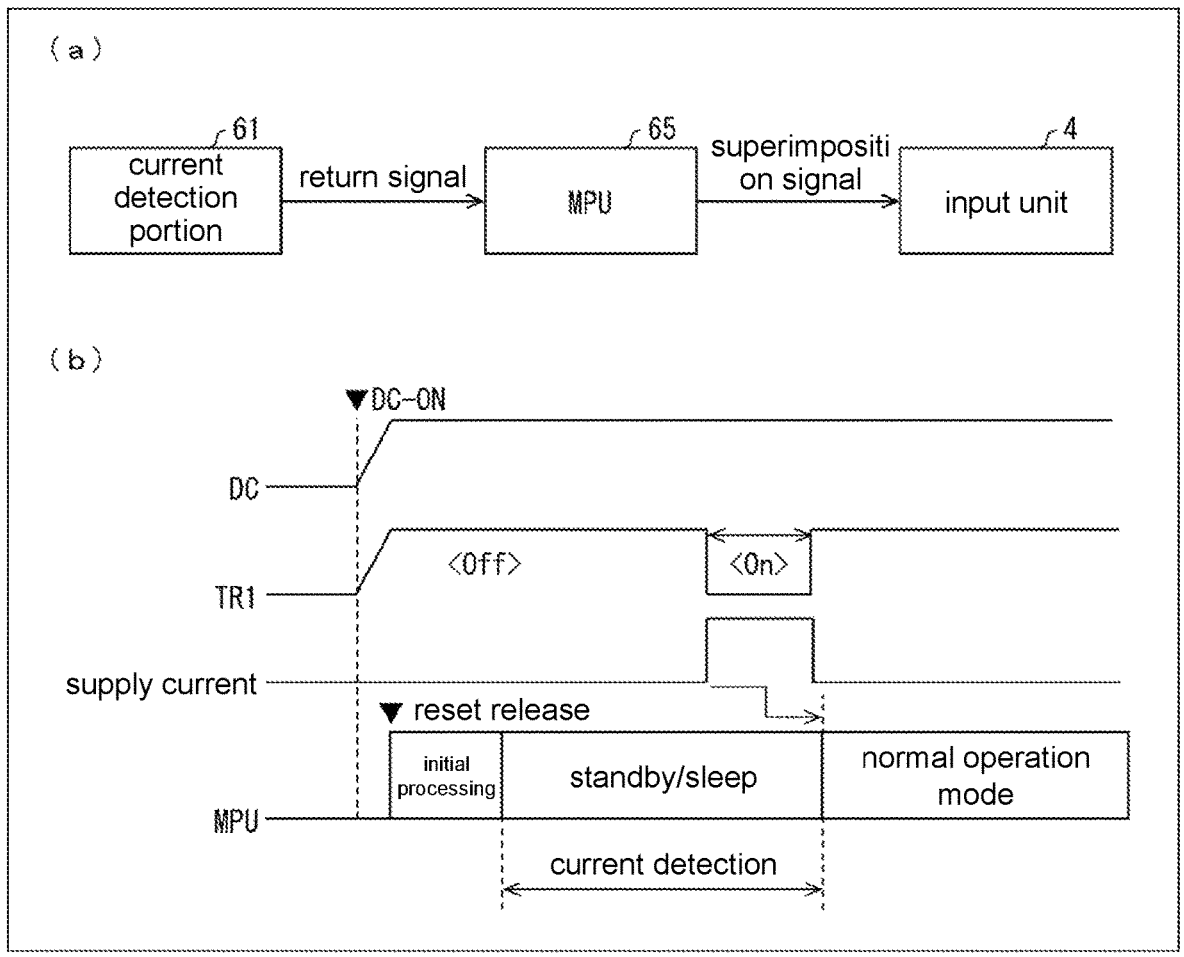
FIG. 9 is a diagram showing a specific example of the operation mode switching in the electric apparatus in an aspect of the disclosure, wherein (a) shows an outline of input/output in a transmission control circuit, and (b) shows a temporal change from the power source ON in the electric apparatus and the input unit.

Each diagram of FIG. 9 is a specific example of the operation mode switching in the electric apparatus 6 in an aspect of the disclosure. (a) of FIG. 9 shows an outline of the input/output in the transmission control circuit 15A, and (b) of FIG. 9 shows a temporal change from the power source ON in the electric apparatus 6 and the input unit 4. Moreover, in the following description, the electric apparatus 6 and the input unit 4 have the circuit configurations shown in FIG. 6, and the current detection portion 61 transmits a return signal when the current detection portion 61 detects that the current value rises to a predetermined threshold value or greater and then falls again to below the predetermined threshold value.

(a) of FIG. 9 shows that when a microprocessor unit (MPU) 65, which performs calculation processing in the superimposition signal transmission portion 63 and the operation mode switching portion 62, receives a return signal from the current detection portion 61, the electric apparatus 6 is returned to the normal operation mode from the waiting state or the hibernation state, and the transmission of the superimposition signal to the input unit 4 is started. That is, when the current detection portion 61 detects the current value equal to or greater than a predetermined threshold value, the current detection portion 61 transmits the return signal to the MPU 65.

The temporal change from the power source ON in the electric apparatus 6 and the input unit 4 is described with reference to (b) of FIG. 9. In the shown example, the same content is shown for the item having the same name as in (c) of FIG. 7.

First, when the power source 20 is started up, the MPU 65 of the electric apparatus 6 releases the reset state, and starts the operation in the waiting state or the sleep state as the low current consumption mode after performing the initial processing. Thereafter, by turning on/off the transistor TR1, the "supply current" rises from below a predetermined threshold value to the predetermined threshold value or greater and then falls again to below the predetermined threshold value. When the current detection portion 61 detects the above situation, the current detection portion 61 transmits the return signal to the MPU 65, and in the MPU 65, the operation mode switching portion 62 switches the low current consumption mode to the normal operation mode based on the return signal. In this way, the electric apparatus 6 can switch the operation mode based on the current value.

(Processing Flow)

Figure 10:
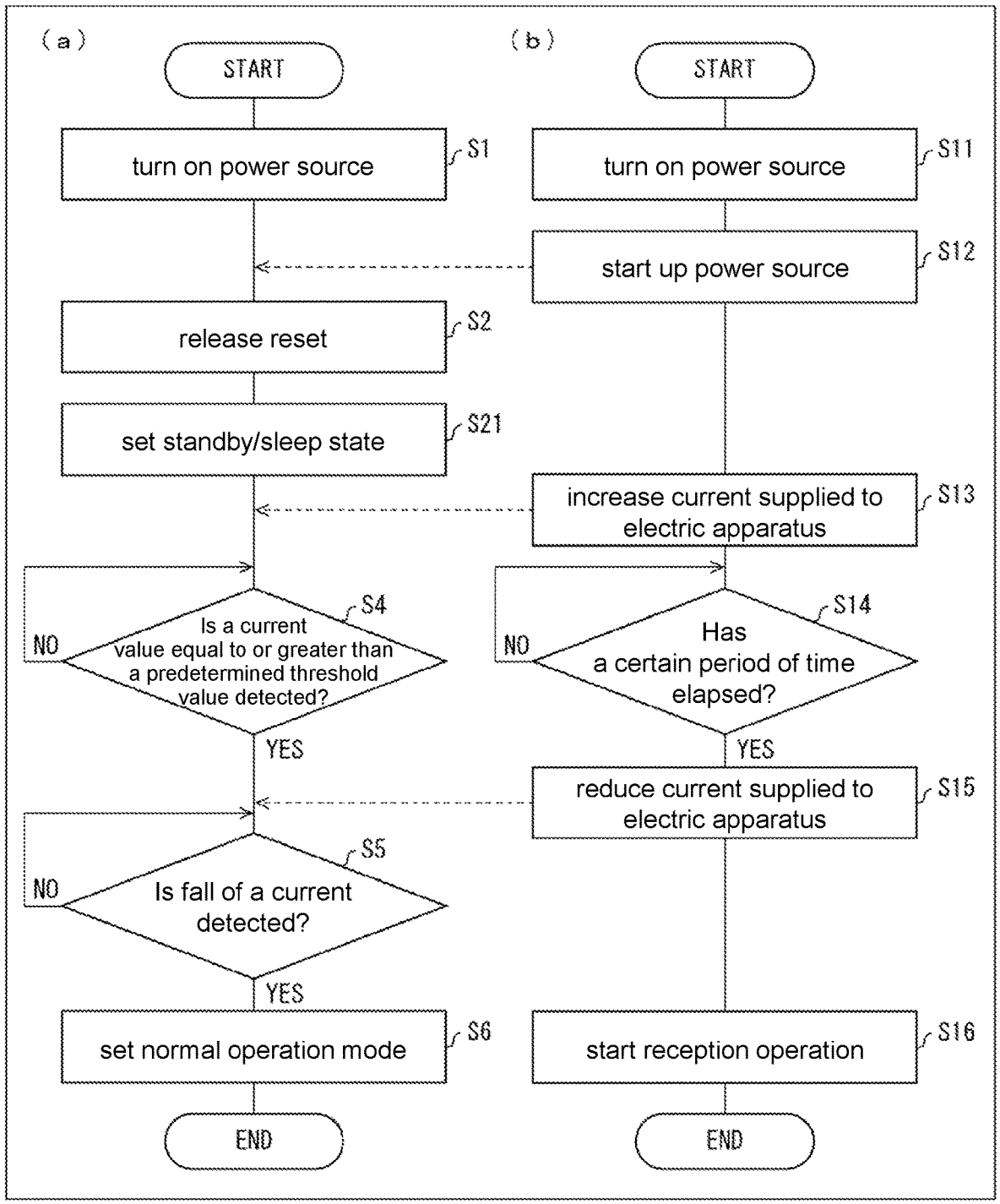
FIG. 10 is a diagram showing flows which indicate an example of the processing executed by the electric apparatus and the input unit in an aspect of the disclosure, wherein (a) shows a flow of the electric apparatus, and (b) shows a flow of the input unit.

FIG. 10 shows a flow which shows an example of the flow of the processing executed by the electric apparatus 6 and the input unit 4 according to an aspect of the disclosure. (a) of FIG. 10 shows a flow of the electric apparatus 6, and (b) of FIG. 10 shows a flow of the input unit 4. Moreover, in the following description, the description of the same processing as in each diagram of FIG. 8 is omitted. In addition, the flow of the input unit 4 shown in (b) of FIG. 10 is completely the same as that in (b) of FIG. 8.

The flow of the electric apparatus 6 is described with reference to (a) of FIG. 10. In the electric apparatus 6, after the reset state is released in S2, the operation mode switching portion 62 sets the standby state or the sleep state as the low current consumption mode (S21). The subsequent processing of S3 to S6 is the same as in the above-described configuration example.

By the above processing, the electric apparatus 6 can suppress the current consumption during the operation to the minimum in the low current consumption mode.

§ 5 Variation Example 2

The electric apparatus 6 and the input unit 4 according to an aspect of the disclosure are described with reference to FIGS. 1, 11, and 12.

(Configurations of Electric Apparatus and Input Unit)

The configurations of the electric apparatus 6 and the input unit 4 according to an aspect of the disclosure are described with reference to FIG. 1 and (a) of FIG. 11. Moreover, the input unit 4 is the same as the input unit 4 in the above-described configuration example.

The basic configuration of the electric apparatus 6 is the same as in the above-described configuration example, but a part of the configuration is different. As shown in (a) of FIG. 11, the electric apparatus 6 is different in terms of further including a reset circuit 64 between the current detection portion 61 and the MPU 65. That is, the current detection portion 61 transmits, to the reset circuit 64, a result of the detection of the current value of the current supplied from the input unit 4 to the electric apparatus 6. When the reset circuit 64 receives the detection result from the current detection portion 61, the reset circuit 64 transmits a reset signal to the MPU 65 to maintain the reset state when the current value of the current supplied from the input unit 4 to the electric apparatus 6 is smaller than a predetermined threshold value. The MPU 65 maintains the reset state while receiving the reset signal from the reset circuit 64, and switches the operation mode to the normal operation mode when the transmission of the reset signal from the reset circuit 64 is stopped. That is, the electric apparatus 6 sets the reset state as the low current consumption mode.

(Specific Example of Operation Mode Switching)

Figure 11:
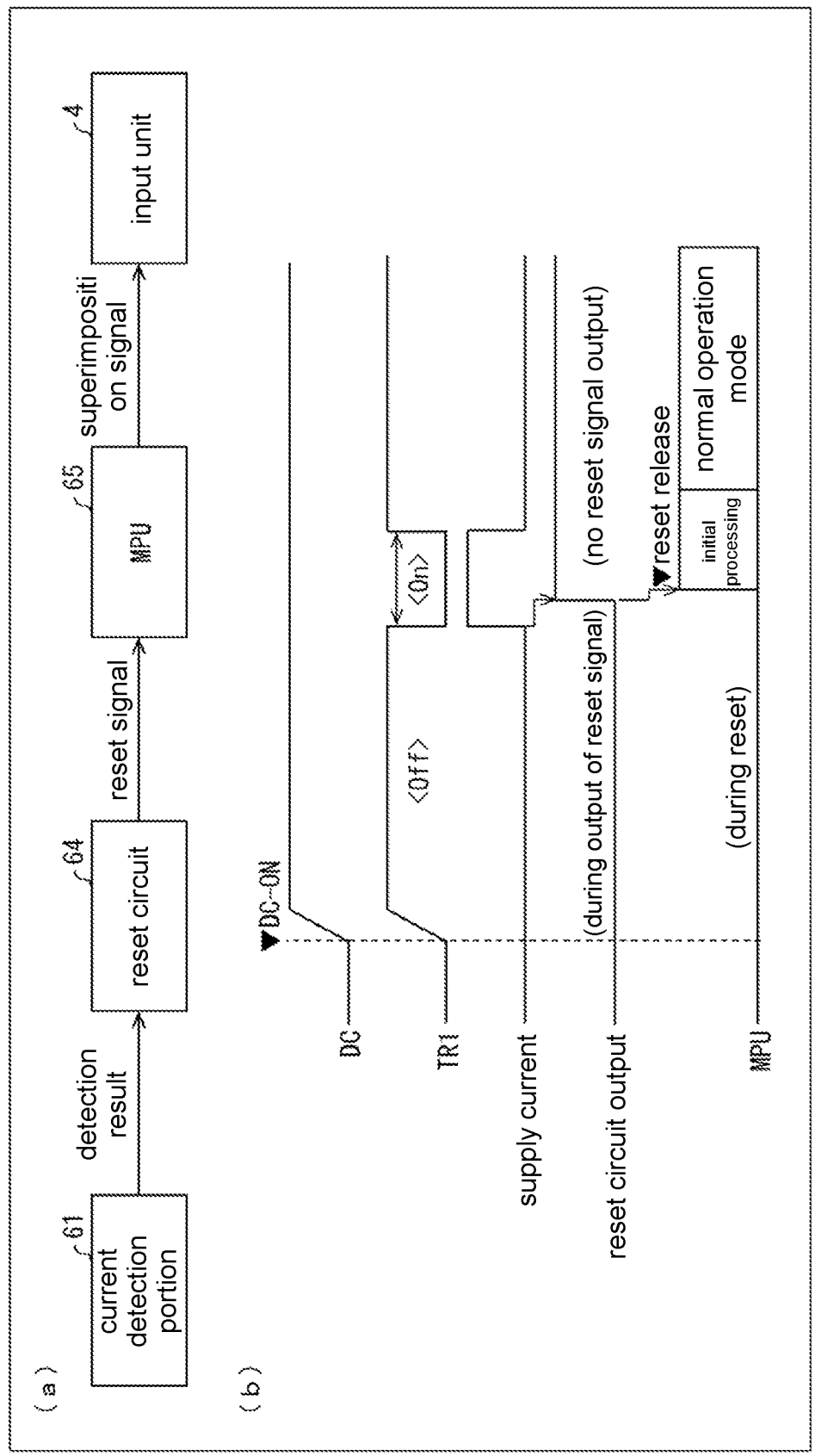
FIG. 11 is a diagram showing a specific example of the operation mode switching in the electric apparatus in an aspect of the disclosure, wherein (a) shows an outline of the input/output in the transmission control circuit, and (b) shows a temporal change from the power source ON in the electric apparatus and the input unit.

(b) of FIG. 11 is a specific example of the operation mode switching in the electric apparatus 6 in an aspect of the disclosure. (b) of FIG. 11 shows a temporal change from the power source ON in the electric apparatus 6 and the input unit 4. Moreover, in the following description, the electric apparatus 6 and the input unit 4 include the circuit configurations shown in FIG. 6. In addition, in the shown example, the same content is shown for the item having the same name as in (c) of FIG. 7, and the "reset circuit output" shows whether or not the reset signal is output from the reset circuit 64 to the MPU 65.

First, when the power source 20 is started up, the reset circuit 64 of the electric apparatus 6 starts to output the reset signal to the MPU 65, and the MPU 65 maintains the reset state based on the reset signal. Thereafter, when the "supply current" rises from below a predetermined threshold value to the predetermined threshold value or greater by turning on/off the transistor TR1, the reset circuit 64 stops the output of the reset signal based on the detection result of the current detection portion 61. Then, the MPU 65 releases the reset state based on the interruption of the reset signal, and operates as the normal operation mode after performing the initial processing. In this way, the electric apparatus 6 can switch the operation mode based on the current value.

(Processing Flow)

Figure 12:
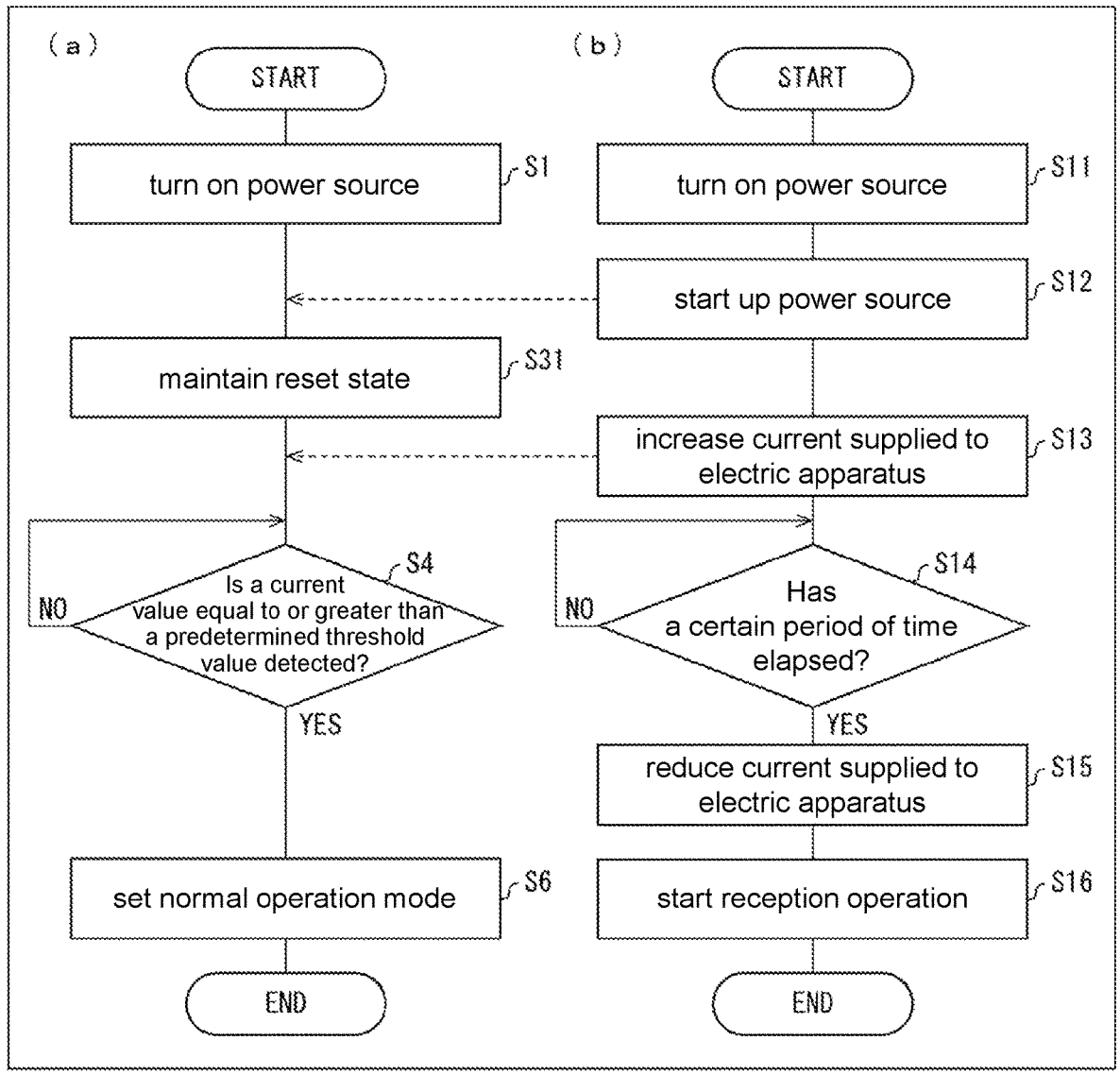
FIG. 12 is a diagram showing flows which indicate an example of the processing executed by the electric apparatus and the input unit in an aspect of the disclosure, wherein (a) shows a flow of the electric apparatus, and (b) shows a flow of the input unit.

Each diagram of FIG. 12 shows a flow which indicates an example of the flow of the processing executed by the electric apparatus 6 and the input unit 4 according to an aspect of the disclosure. (a) of FIG. 12 shows a flow of the electric apparatus 6, and (b) of FIG. 12 shows a flow of the input unit 4. Moreover, in the following description, the description of the same processing as in each diagram of FIG. 8 is omitted. In addition, the flow of the input unit 4 shown in (b) of FIG. 12 is completely the same as that in (b) of FIG. 8.

The flow of the electric apparatus 6 is described with reference to (a) of FIG. 12. In the electric apparatus 6, after the power source is turned on in S1, the reset state is maintained based on the reset signal transmitted from the reset circuit 64 to the MPU 65 (S31). The electric apparatus 6 then proceeds to the processing of S4.

When the current supplied from the input unit 4 is increased by the processing of S13, and the current equal to or greater than a predetermined threshold value is detected in the current detection portion 61 (YES in S4), the reset circuit 64 stops the transmission of the reset signal, and thus the operation mode switching portion 62 of the MPU 65 sets the normal operation mode (S6).

By the above processing, the MPU 65 is maintained in the reset state in the low current consumption mode in the electric apparatus 6, and thus the current consumption by the MPU 65 can be suppressed to the minimum.

§ 6 Variation Example 3

The electric apparatus 6 and the input unit 4 according to an aspect of the disclosure are described with reference to FIGS. 1, 13, and 14.

(Configurations of Electric Apparatus and Input Unit)

The configurations of the electric apparatus 6 and the input unit 4 according to an aspect of the disclosure are described with reference to FIG. 1 and (a) of FIG. 13.

Moreover, the input unit 4 is the same as the input unit 4 in the above-described configuration example.

The basic configuration of the electric apparatus 6 is the same as in the above-described configuration example, but a part of the configuration is different. As shown in (a) of FIG. 13, the electric apparatus 6 is different in that two MPUs which are a first MPU 65A and a second MPU 65B are included instead of the MPU 65. In other words, the MPU 65 is configured by the first MPU 65A and the second MPU 65B.

The first MPU 65A is a transmission control circuit used when the electric apparatus 6 operates in the normal operation mode, and the second MPU 65B is a transmission control circuit used when the electric apparatus 6 operates in the low current consumption mode. Besides, the operation mode switching portion 62 switches the MPUs used for operation between the first MPU 65A and the second MPU 65B.

Figure 13:
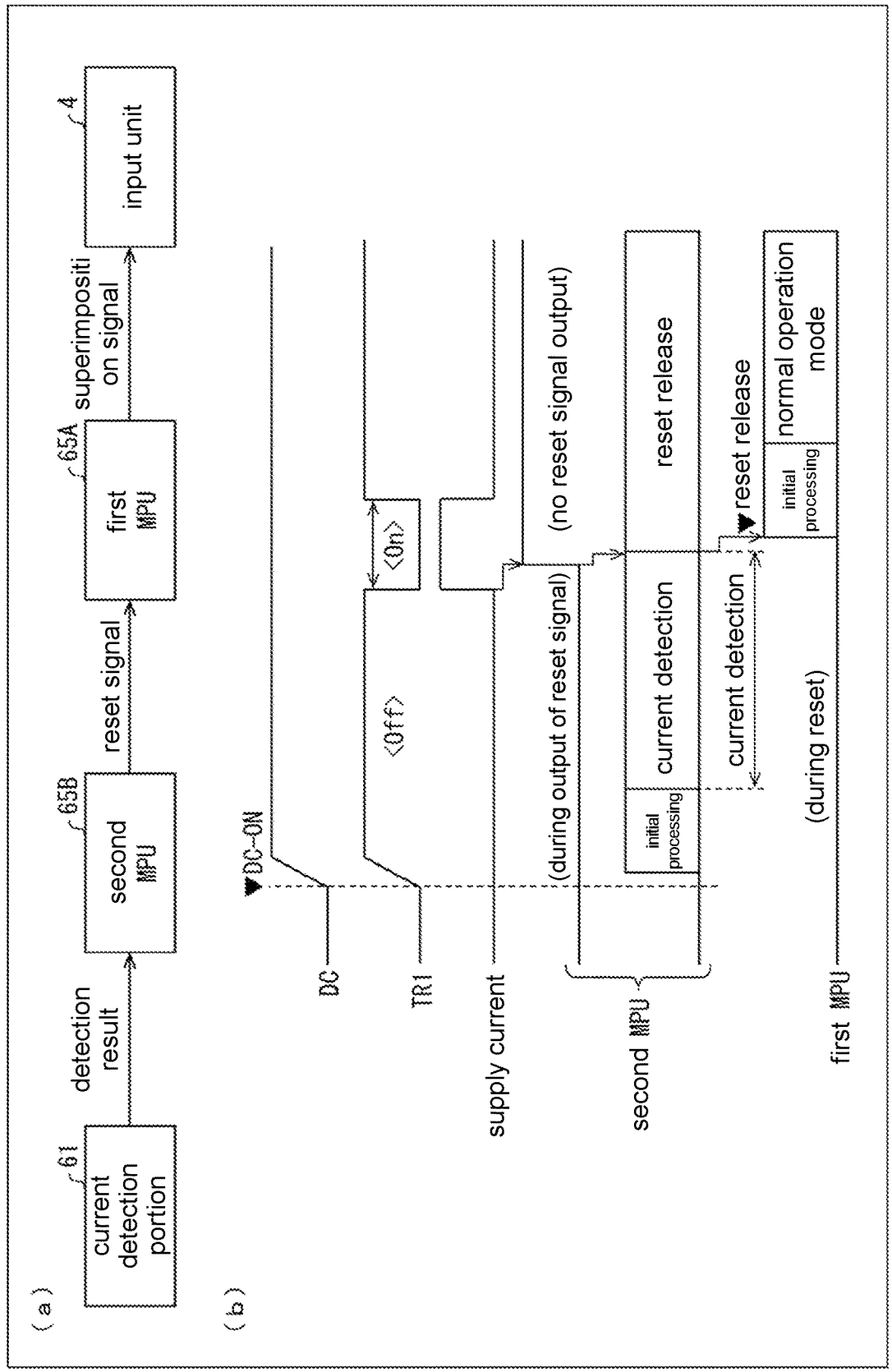
FIG. 13 is a diagram showing a specific example of the operation mode switching in the electric apparatus in an aspect of the disclosure, wherein (a) shows an outline of input/output in a first transmission control circuit and a second transmission control circuit, and (b) shows a temporal change from the power source ON in the electric apparatus and the input unit.

As shown in (a) of FIG. 13, the current detection portion 61 transmits, to the second MPU 65B, the result of the detection of the current value of the current supplied from the input unit 4 to the electric apparatus 6. When the second MPU 65B receives the detection result from the current detection portion 61, the second MPU 65B transmits a reset signal to the first MPU 65A to maintain the reset state when the current value of the current supplied from the input unit 4 to the electric apparatus 6 is smaller than a predetermined threshold value. The first MPU 65A maintains the reset state while receiving the reset signal from the second MPU 65B, and when the transmission of the reset signal from the second MPU 65B is stopped, the operation mode is switched to the normal operation mode. That is, the electric apparatus 6 sets the reset state as the low current consumption mode.

(Specific Example of Operation Mode Switching)

A specific example of the operation mode switching in the electric apparatus 6 in an aspect of the disclosure is described with reference to (b) of FIG. 13. (b) of FIG. 13 shows a temporal change from the power source ON in the electric apparatus 6 and the input unit 4. Moreover, in the following description, the electric apparatus 6 and the input unit 4 have the circuit configurations shown in FIG. 6. In addition, in the shown example, the same content is shown for the item having the same name as in (c) of FIG. 7. The "first MPU" shows a state of the first MPU 65A, and the "second MPU" shows a state of the second MPU 65B.

First, when the power source 20 is started up, the second MPU 65B starts to output the reset signal to the first MPU 65A, and the first MPU 65A maintains the reset state based on the reset signal. Thereafter, when the "supply current" rises from below a predetermined threshold value to the predetermined threshold value or greater by turning on/off the transistor TR1, the second MPU 65B stops the output of the reset signal based on the detection result of the current detection portion 61. Then, the first MPU 65A releases the reset state based on the interruption of the reset signal, and operates as the normal operation mode after performing the initial processing. In this way, the electric apparatus 6 can switch the operation mode based on the current value.

(Processing flow)

Figure 14:
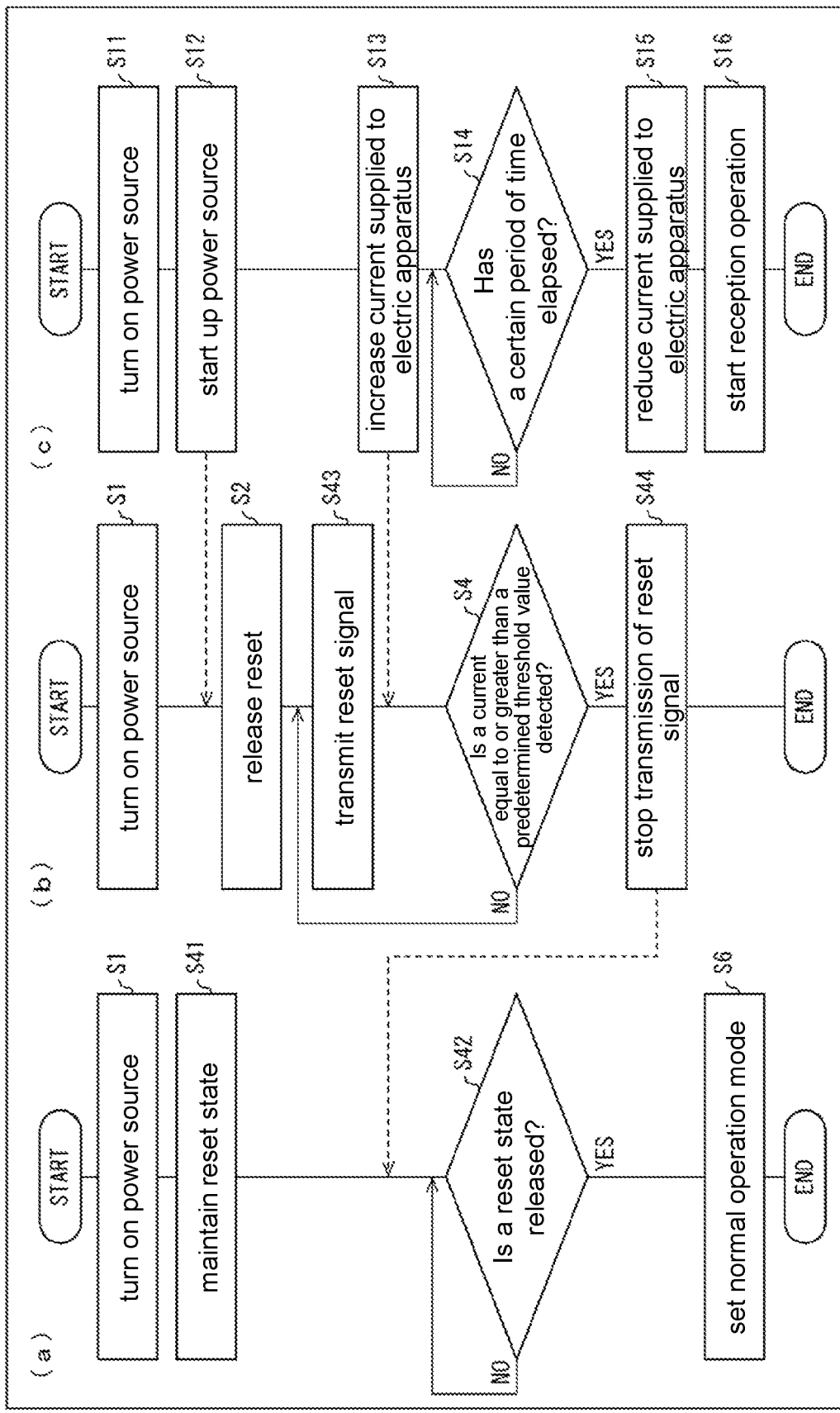
FIG. 14 is a diagram showing flows which indicate an example of the processing executed by the electric apparatus and the input unit in an aspect of the disclosure, wherein (a) shows a flow in the first transmission control circuit, (b) shows a flow in the second transmission control circuit, and (c) shows a flow of the input unit.

Each diagram of FIG. 14 shows a flow which indicates an example of the flow of the processing executed by the electric apparatus 6 and the input unit 4 according to an aspect of the disclosure. (a) of FIG. 14 shows a flow of the first MPU 65A, and (b) of FIG. 14 shows a flow of the second MPU 65B. (c) of FIG. 14 shows a flow of the input unit 4. Moreover, in the following description, the description of the same processing as in each diagram of FIG. 8 is omitted. In addition, the flow of the input unit 4 shown in (c) of FIG. 14 is completely the same as that in (b) of FIG. 8.

The flow of the first MPU 65A is described with reference to (a) of FIG. 14. In the electric apparatus 6, after the power source is turned on in S1, the reset state is maintained based on the reset signal transmitted from the second MPU 65B to the first MPU 65A (S41). The first MPU 65A then proceeds to the processing of S42.

In S42, the first MPU 65A determines whether or not the reset state is released by the second MPU 65B stopping the transmission of the reset signal (S42). When the first MPU 65A determines that the reset state is released (YES in S42), the operation mode switching portion 62 of the first MPU 65A sets the normal operation mode (S6).

The flow of the second MPU 65B is described with reference to (b) of FIG. 14. Because the second MPU 65B is included in the electric apparatus 6 similarly to the first MPU 65A, the power source is turned on by the same processing of S1. After S2, the second MPU 65B transmits the reset signal to the first MPU 65A until the current detection portion 61 detects the current equal to or greater than a predetermined threshold value (S43).

When the current supplied from the input unit 4 is increased by the processing of S13, and the current equal to or greater than a predetermined threshold value is detected in the current detection portion 61 (YES in S4), the second MPU 65B stops the transmission of the reset signal to the first MPU 65A (S44).

By the above processing, the electric apparatus 6 can switch the transmission control circuit used for operation from the second MPU 65B to the first MPU 65A when a current equal to or greater than a predetermined threshold value is detected. Thereby, the current consumption by the first MPU 65A can be suppressed to the minimum by using, for example, the second MPU 65B which does not have the function of transmitting the superimposition signal to the communication device.

§ 7 Variation Example 4

(Configurations of Electric Apparatus and Input Unit)

Figure 15:
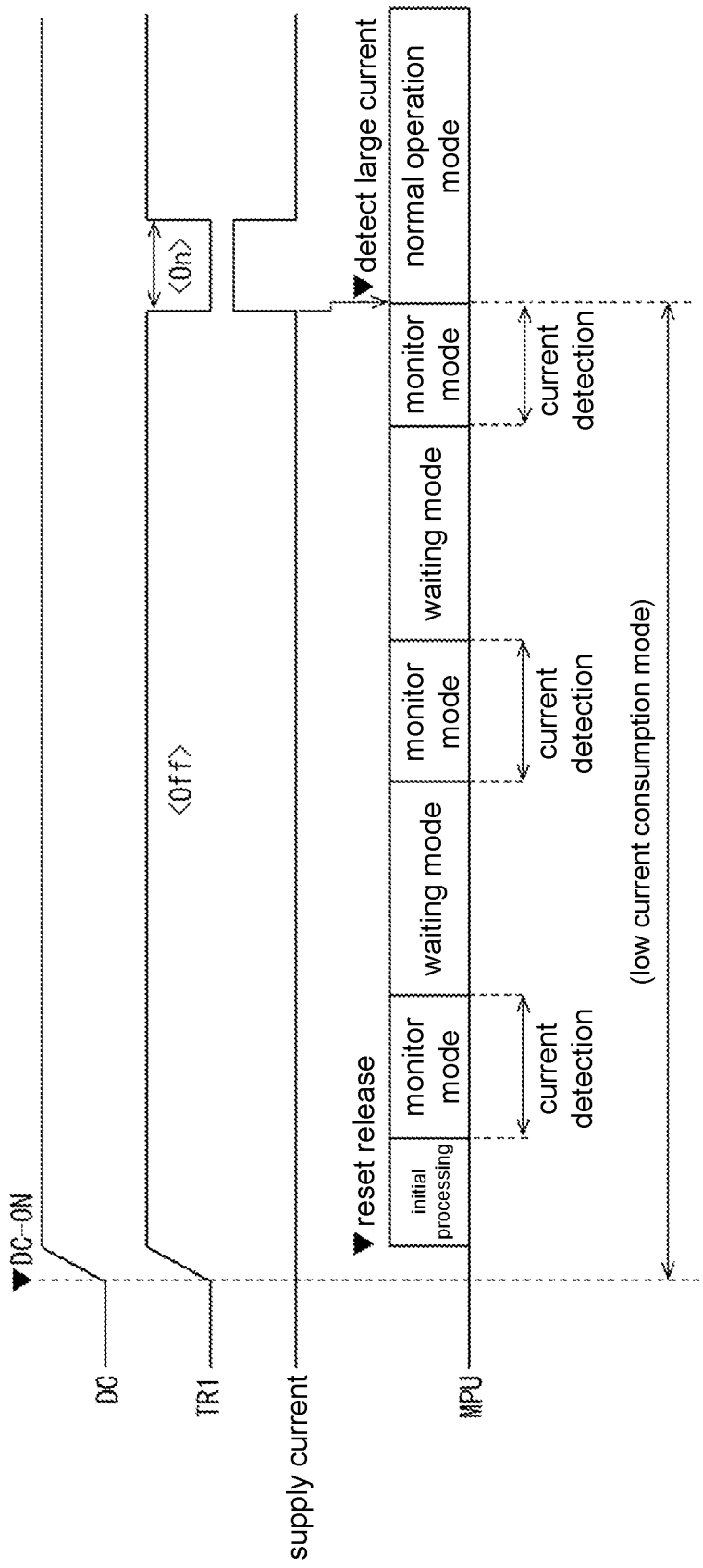
FIG. 15 shows a temporal change from the power source ON in the electric apparatus and the input unit in an aspect of the disclosure.
Figure 16:
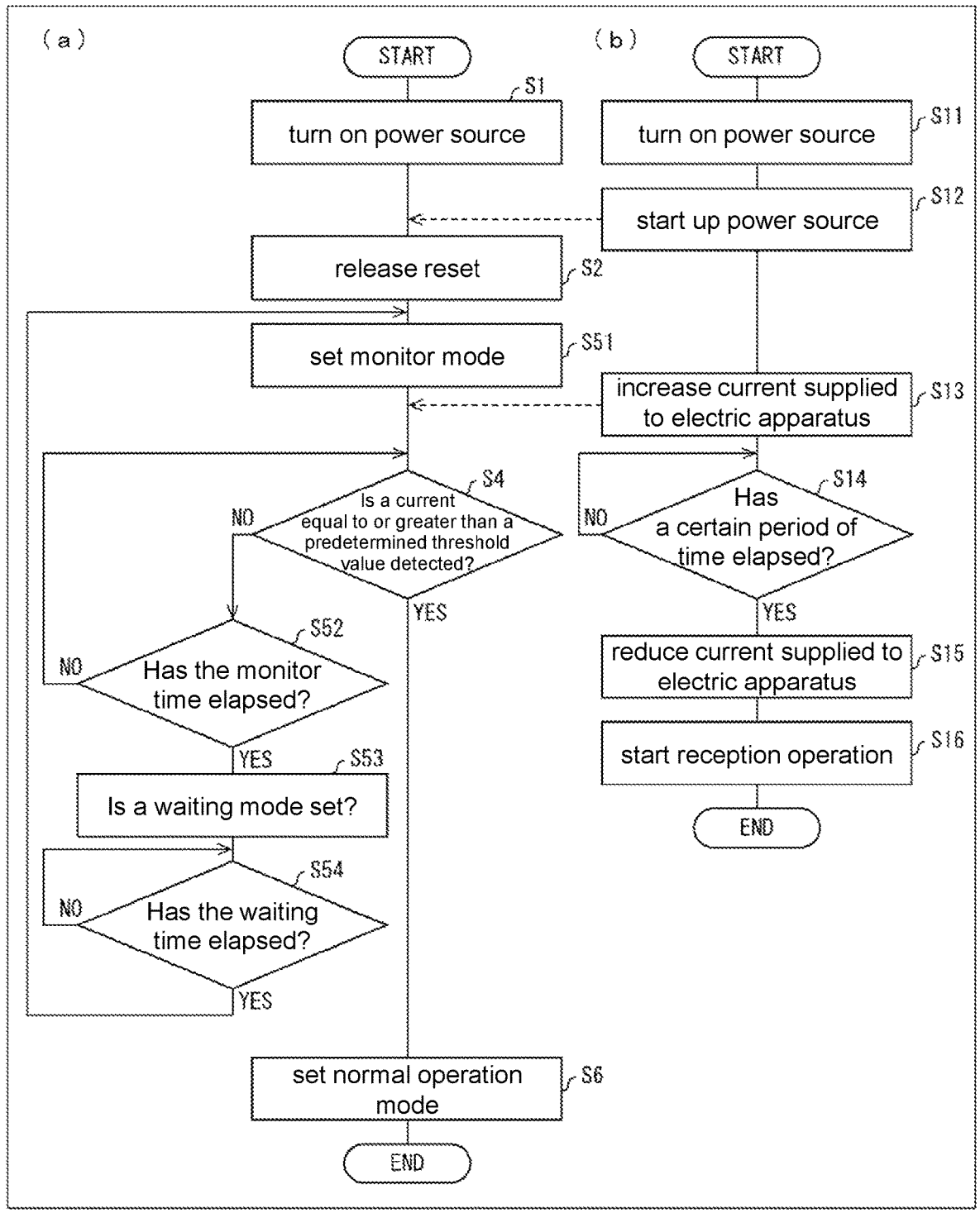
FIG. 16 is a diagram showing flows which indicate an example of the processing executed by the electric apparatus and the input unit in an aspect of the disclosure, wherein (a) shows a flow of the electric apparatus, and (b) shows a flow of the input unit.

The electric apparatus 6 and the input unit 4 according to an aspect of the disclosure are described with reference to FIGS. 1, 15, and 16.

(Configurations of Electric Apparatus and Input Unit)

The configurations of the electric apparatus 6 and the input unit 4 according to an aspect of the disclosure are described with reference to FIG. 1. Moreover, the input unit 4 is the same as the input unit 4 in the above-described configuration example.

The electric apparatus 6 has the same basic configuration as the above-described configuration example, except that the current detection portion 61 is made to periodically detect the current value in the low current consumption mode. That is, during the operation in the low current consumption mode, the electric apparatus 6 periodically switches between a monitor mode in which the current detection portion 61 is made to periodically detect the current value and a waiting mode in which the current value is not detected. Then, the electric apparatus 6 can switch the operation mode from the monitor mode to the normal operation mode when the current detection portion 61 detects the current having a current value equal to or greater than a predetermined threshold value during the operation in the monitor mode.

In the description with reference to FIG. 8 in the above-described operation example, a case is assumed in which the electric apparatus 6 is supplied with the current having a current value equal to or greater than a predetermined threshold value from the input unit 4 immediately after being started up in the low current consumption mode. However, when it takes a long time from the start-up of the electric apparatus 6 in the low current consumption mode to the detection of the current value equal to or greater than a predetermined threshold value performed by the current detection portion 61, the electric apparatus 6 may erroneously recognize that the input unit 4 does not correspond to the superimposition signal and start the operation. By making the current detection portion 61 periodically detect the current value in the low current consumption mode, for example, even if it takes time, in the input unit 4, from the start-up of the input unit 4 to the supply of the current having a current value equal to or greater than a predetermined threshold value to the electric apparatus 6, the electric apparatus 6 can detect the current and switch the low current consumption mode to the normal operation mode.

(Specific Example of Operation Mode Switching)

A specific example of the operation mode switching in the electric apparatus 6 in an aspect of the disclosure is described with reference to FIG. 15. FIG. 15 shows a temporal change from the power source ON in the electric apparatus 6 and the input unit 4. Moreover, in the following description, the electric apparatus 6 and the input unit 4 have the circuit configurations shown in FIG. 6, and the description of the item having the same name as in (c) of FIG. 7 is omitted.

First, when the power source 20 is started up, the transmission control circuit 15A of the electric apparatus 6 releases the reset state, and starts the operation in the monitor mode after performing the initial processing. If the current detection portion 61 does not detect the current value equal to or greater than a predetermined threshold value at the time when the predetermined monitor time has elapsed, the operation mode switching portion 62 of the transmission control circuit 15A switches the operation mode to the waiting mode. Then, when the predetermined waiting time elapses in the waiting mode, the operation mode switching portion 62 switches the operation mode to the monitor mode again. In this way, the electric apparatus 6 periodically switches between the monitor mode and the waiting mode until the current detection portion 61 detects the current value equal to or greater than a predetermined threshold value during the operation in the monitor mode.

Thereafter, the "supply current" rises from below a predetermined threshold value to the predetermined threshold value or greater by turning on/off the transistor TR1. When the current detection portion 61 detects the above situation while the electric apparatus 6 is operating in the monitor mode, the operation mode switching portion 62 of the transmission control circuit 15A switches the operation mode from the monitor mode to the normal operation mode. In this way, the electric apparatus 6 can switch the operation mode based on the current value.

(Processing Flow)

A flow of the processing executed by the electric apparatus 6 and the input unit 4 according to an aspect of the disclosure is described with reference to each diagram of FIG. 16. FIG. 16 is a diagram showing flows which indicate an example of the processing executed by the electric apparatus 6 and the input unit 4 according to an aspect of the disclosure, (a) of FIG. 16 shows a flow of the electric apparatus 6, and (b) of FIG. 16 shows a flow of the input unit 4. Moreover, in the following description, the description of the same processing as in each diagram of FIG. 8 is omitted. In addition, the flow of the input unit 4 shown in (b) of FIG. 16 is completely the same as that in (b) of FIG. 8.

The flow of the electric apparatus 6 is described with reference to (a) of FIG. 16. In the electric apparatus 6, after the reset state is released in S2, the operation mode switching portion 62 sets the monitor mode (S51). Then, when the current equal to or greater than a predetermined threshold value is not detected in S4 (NO in S4), the transmission control circuit 15A determines whether or not the predetermined monitor time has elapsed (S52). When the transmission control circuit 15A determines that the predetermined monitor time has not elapsed (NO in S52), the processing proceeds to S4, and the processing of S4 and S52 is executed again. On the other hand, when the transmission control circuit 15A determines that the predetermined monitor time has elapsed (YES in S52), the operation mode switching portion 62 sets the waiting mode (S53).

After S53, when the transmission control circuit 15A determines that the predetermined waiting time has elapsed (YES in S54), the processing proceeds to S51, and the monitor mode is set again by the operation mode switching portion 62. Thereafter, a series of processing of S51, S4, and S52 to S54 is executed again.

On the other hand, when it is determined in S4 that the current detection portion 61 detects the current equal to or greater than a predetermined threshold value (YES in S4), the operation mode switching portion 62 sets the normal operation mode (S6), and the series of processing is finished.

By the above processing, even if it takes time, in the input unit 4, from the start-up of the input unit 4 to the supply of the current having a current value equal to or greater than a predetermined threshold value to the electric apparatus 6, the electric apparatus 6 can detect the current and switch the operation mode to the normal operation mode.

SUMMARY

The present invention adopts the following configuration in order to solve the above-described problems.

That is, an electric apparatus according to an aspect of the disclosure includes: a superimposition signal transmission portion which transmits an operation signal corresponding to a state of an operation element to an external communication device, or inputs an operation signal for controlling an operation element from the communication device, and transmits, to the communication device, a superimposition signal obtained by superimposing a data signal indicating predetermined information on the operation signal; an operation mode switching portion which switches between a normal operation mode in which the transmission of the superimposition signal is performed and a low current consumption mode in which the transmission of the superimposition signal is not performed; and a current detection portion which detects a current value supplied from the communication device, wherein the operation mode switching portion switches the low current consumption mode to the normal operation mode when the current detection portion detects a current equal to or greater than a predetermined threshold value in the low current consumption mode.

According to the configuration, the electric apparatus can switch the low current consumption mode to the normal operation mode when the current equal to or greater than a predetermined threshold value is detected during the operation in the low current consumption mode. Here, when the communication device connected to the electric apparatus is a communication device corresponding to the reception of the superimposition signal, the communication device can be configured to supply a current equal to or greater than a predetermined threshold value to the electric apparatus. In this case, the electric apparatus can operate in different operation modes when the electric apparatus is connected to a communication device that corresponds to the superimposition signal and when the electric apparatus is connected to a communication device that does not correspond to the superimposition signal. Therefore, an electric apparatus can be provided, which has excellent convenience and operates by switching the operation mode according to the type of the communication device of a connection destination.

In the electric apparatus according to an aspect, the operation element may output an ON/OFF signal as the operation signal, and the superimposition signal transmission portion may transmit the operation signal to the communication device and transmit a superimposition signal obtained by superimposing the data signal on the operation signal to the communication device. According to the configuration, when the data signal is superimposed on the operation signal, the current value rises. Here, when the ON/OFF signal is transmitted to the communication device as the operation signal, there is a possibility that the communication device that does not correspond to the superimposition signal cannot accurately detect the operation signal if the current value at the time when the operation signal is OFF is equal to or greater than a predetermined value. In contrast, according to the above configuration, when the electric apparatus is connected to the communication device that does not correspond to the superimposition signal, the operation mode becomes the low current consumption mode in which the transmission of the superimposition signal is not performed, and thus the operation signal can be appropriately detected even for the communication device which does not correspond to the superimposition signal.

In the electric apparatus according to an aspect, the superimposition signal transmission portion may start the transmission of the superimposition signal when the current detection portion detects a current equal to or greater than a predetermined threshold value and then detects that the current is changed to be smaller than the predetermined threshold value. According to the configuration, the electric apparatus can stably perform the communication after switching the operation mode based on the current equal to or greater than a predetermined threshold value and then being supplied with the electric power by the normal current value smaller than the predetermined threshold value.

The electric apparatus according to an aspect may further include a calculation portion which performs calculation processing in the superimposition signal transmission portion and the operation mode switching portion, and the calculation portion may set an operation clock frequency in the low current consumption mode to be lower than an operation clock frequency in the normal operation mode. According to the configuration, the electric apparatus can switch the operation mode by switching the operation clock frequency of the calculation portion. Thereby, the electric apparatus can execute various calculation processing other than the transmission of the superimposition signal at a constant operation speed even in the low current consumption mode.

The electric apparatus according to an aspect may further include a calculation portion which performs calculation processing in the superimposition signal transmission portion and the operation mode switching portion, and the calculation portion may be in a waiting state or a hibernation state in the low current consumption mode, and perform a normal operation in the normal operation mode. According to the configuration, the electric apparatus can suppress the current consumption to the minimum during the operation in the low current consumption mode.

The electric apparatus according to an aspect may further include a calculation portion which performs calculation processing in the superimposition signal transmission portion and the operation mode switching portion, and the calculation portion may maintain itself in a reset state in the low current consumption mode, and release the reset state to operate in the normal operation mode. According to the configuration, the calculation portion is maintained in the reset state in the low current consumption mode in the electric apparatus, and thus the current consumption by the calculation portion can be suppressed to the minimum.

The electric apparatus according to an aspect may further include a calculation portion which performs calculation processing in the superimposition signal transmission portion and the operation mode switching portion, and the calculation portion may be further configured by a first calculation portion used in a case of operating in the normal operation mode and a second calculation portion used in a case of operating in the low current consumption mode, and the operation mode switching portion may perform switching for either the first calculation portion or the second calculation portion to operate. According to the configuration, when the current equal to or greater than a predetermined threshold value is detected, the electric apparatus can switch the calculation portion used for operation from the first calculation portion to the second calculation portion. Thereby, the current consumption can be suppressed to the minimum by using, for example, the second calculation portion which does not have the function of transmitting the superimposition signal to the communication device.

In the electric apparatus according to an aspect, the operation mode switching portion may make the current detection portion periodically monitor the current value in the low current consumption mode. According to the configuration, for example, even if it takes time, in the communication device, from the start-up of the communication device to the supply of the current having a current value equal to or greater than a predetermined threshold value to the electric apparatus, the electric apparatus can detect the current and switch the operation mode to the normal operation mode.

A communication device according to an aspect of the disclosure, which is capable of communicating with the electric apparatus according to the present invention, includes: an operation signal processing portion which detects the operation signal; a data signal processing portion which extracts the data signal from the superimposition signal; and a current control portion which supplies a current to the electric apparatus in a manner that a current having a current value equal to or greater than a predetermined threshold value flows for a certain period of time after the electric apparatus is started up. According to the configuration, by supplying the current having a current value equal to or greater than a predetermined threshold value to the electric apparatus, the communication device can notify the electric apparatus that the communication device is a communication device corresponding to the superimposition signal. Therefore, it is possible to operate the electric apparatus in the normal operation mode and receive the superimposition signal.

A communication system according to an aspect of the disclosure includes: the electric apparatus according to an aspect; and the communication device according to an aspect, which is connected to the electric apparatus.

[Implementation Example by Software]

A control block of the electric apparatus 6 and the input unit 4 may be implemented by a logic circuit (hardware) formed by an integration circuit (IC chip) or the like, or may be implemented by software.

In the latter case, the electric apparatus 6 and the input unit 4 include a computer which executes a command of a program which is software for implementing each function. The computer includes, for example, one or more processors and a computer-readable recording medium which stores the program. Besides, in the computer, the processor reads the program from the recording medium and executes the program, and thereby the object of the present invention is achieved. As the processor, for example, a central processing unit (CPU) can be used. As the recording medium, in addition to a "non-transitory tangible media" such as a read only memory (ROM) or the like, a tape, a disk, a card, a semiconductor memory, a programmable logic circuit, or the like can be used. In addition, a random access memory (RAM) or the like which expands the program may be further included. In addition, the program may be supplied to the computer via an arbitrary transmission medium (a communication network, a broadcast wave, or the like) capable of transmitting the program. Moreover, an aspect of the disclosure can also be implemented in the form of a data signal which is embedded in a carrier wave and in which the program is embodied by electronic transmission.

The present invention is not limited to each of the above-described embodiments, and various modifications can be made within the scope shown in claims, and embodiments which are obtained by appropriately combining the technical mechanisms respectively disclosed in different embodiments are also included in the technical scope of the present invention.

What is claimed is:

1. An electric apparatus, comprising one or more processors configured to:
    transmit an operation signal corresponding to a state of an operation element to an external communication device or inputs an operation signal for controlling an operation element from the communication device, and transmit, to the communication device, a superimposition signal obtained by superimposing a data signal indicating predetermined information on the operation signal;
    switch between a normal operation mode in which transmission of the superimposition signal is performed and a low current consumption mode in which transmission of the superimposition signal is not performed; and
    detect a current value supplied from the communication device, wherein
    the one or more processors switches to the normal operation mode when detecting a current equal to or greater than a predetermined threshold value in the low current consumption mode.

2. The electric apparatus according to claim 1, wherein the operation element outputs an ON/OFF signal as the operation signal, and
    the one or more processors transmits the operation signal to the communication device and transmits a superimposition signal obtained by superimposing the data signal on the operation signal to the communication device.

3. The electric apparatus according to claim 2, wherein the one or more processors is configured to start to transmit the superimposition signal when detecting a current equal to or greater than a predetermined threshold value and then detecting that the current is changed to be smaller than the predetermined threshold value.

4. The electric apparatus according to claim 2, wherein the one or more processors is further configured to
    set an operation clock frequency in the low current consumption mode to be lower than an operation clock frequency in the normal operation mode.

5. The electric apparatus according to claim 2, wherein the one or more processors is in a waiting state or a hibernation state in the low current consumption mode, and performs a normal operation in the normal operation mode.

6. The electric apparatus according to claim 2, wherein the one or more processors is further configured to maintain itself in a reset state in the low current consumption mode, and release the reset state to operate in the normal operation mode.

7. The electric apparatus according to claim 2, wherein the one or more processors comprises
    a first microprocessor used in a case of operating in the normal operation mode and a second microprocessor used in a case of operating in the low current consumption mode,
    wherein the one or more processors performs switching for either the first microprocessor or the second microprocessor to operate.

8. The electric apparatus according to claim 2, wherein the one or more processors is configured to periodically monitor the current value in the low current consumption mode.

9. The electric apparatus according to claim 1, wherein the one or more processors starts to transmit the superimposition signal when detecting a current equal to or greater than a predetermined threshold value and then detecting that the current is changed to be smaller than the predetermined threshold value.

10. The electric apparatus according to claim 1, wherein the one or more processors is further configured to
    set an operation clock frequency in the low current consumption mode to be lower than an operation clock frequency in the normal operation mode.

11. The electric apparatus according to claim 1, wherein the one or more processors is in a waiting state or a hibernation state in the low current consumption mode, and the one or more processors performs a normal operation in the normal operation mode.

12. The electric apparatus according to claim 1, wherein the one or more processors is further configured to
    maintain itself in a reset state in the low current consumption mode, and release the reset state to operate in the normal operation mode.

13. The electric apparatus according to claim 1, wherein the one or more processors comprises
    a first microprocessor used in a case of operating in the normal operation mode and a second microprocessor used in a case of operating in the low current consumption mode,
    wherein the one or more processors performs switching for either the first microprocessor or the second microprocessor to operate.

14. The electric apparatus according to claim 1, wherein the one or more processors is configured to periodically monitor the current value in the low current consumption mode.

15. A communication system, comprising:

the electric apparatus according to claim 1; and a communication device, which is connected to the electric apparatus and is configured to communicate with the electric apparatus, the communication device comprising one or more processors configured to:

detect the operation signal;

extract the data signal from the superimposition signal; and supply a current to the electric apparatus in a manner that a current having a current value equal to or greater than a predetermined threshold value flows for a certain period of time after the electric apparatus is started up to notify the electric apparatus that the communication device corresponds to the superimposition signal.

* * * * *